United States Patent
Ogaki et al.

(10) Patent No.: US 7,065,370 B2
(45) Date of Patent: Jun. 20, 2006

(54) POSITIONING INFORMATION TRANSMITTING DEVICE AND POSITIONING INFORMATION TRANSMITTING/RECEIVING SYSTEM

(75) Inventors: Tadao Ogaki, Chiba (JP); Tadahiro Ohata, Kanagawa (JP); Shizue Okuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 10/235,124

(22) Filed: Sep. 5, 2002

(65) Prior Publication Data

US 2003/0073447 A1    Apr. 17, 2003

(30) Foreign Application Priority Data

Sep. 6, 2001    (JP) ............................. 2001-270928

(51) Int. Cl.
     H04Q 7/20    (2006.01)
(52) U.S. Cl. ................. 455/457; 455/456.1; 455/456.3; 455/556.1; 455/556.2
(58) Field of Classification Search ............ 455/456.1, 455/457, 414.4, 456.3, 456.6, 404.32, 420, 455/500, 404.2, 557, 556.2
     See application file for complete search history.

(56) References Cited

U.S. PATENT DOCUMENTS

| | | | |
|---|---|---|---|
| 5,705,980 A * | 1/1998 | Shapiro .................. | 340/539.11 |
| 5,786,789 A * | 7/1998 | Janky ...................... | 342/357.1 |
| 6,115,601 A * | 9/2000 | Ferreira .................... | 455/406 |
| 6,169,890 B1 * | 1/2001 | Vatanen .................... | 455/406 |
| 6,253,322 B1 * | 6/2001 | Susaki et al. ............. | 713/170 |
| 6,285,991 B1 * | 9/2001 | Powar ....................... | 705/76 |
| 6,477,353 B1 * | 11/2002 | Honda et al. ............. | 455/11.1 |
| 6,522,889 B1 * | 2/2003 | Aarnio ...................... | 455/456.5 |
| 6,636,742 B1 * | 10/2003 | Torkki et al. .............. | 455/456.1 |
| 2001/0021654 A1 * | 9/2001 | Spratt et al. ............... | 455/500 |
| 2001/0022624 A1 * | 9/2001 | Tanaka et al. ............ | 348/333.02 |
| 2002/0002036 A1 * | 1/2002 | Uehara et al. ............. | 455/41 |
| 2002/0032035 A1 * | 3/2002 | Teshima ..................... | 455/456 |
| 2002/0142768 A1 * | 10/2002 | Murata et al. ............. | 455/426 |
| 2003/0060218 A1 * | 3/2003 | Billerbeck et al. ......... | 455/501 |
| 2003/0075599 A1 * | 4/2003 | Takatsuki et al. .......... | 235/380 |
| 2004/0077334 A1 * | 4/2004 | Joyce et al. ................ | 455/406 |

(Continued)

OTHER PUBLICATIONS

Patent Abstracts of Japan, 2003-032590 published on Jan. 31, 2003.

(Continued)

*Primary Examiner*—Eliseo Ramos-Feliciano
*Assistant Examiner*—Dai Phuong
(74) *Attorney, Agent, or Firm*—Frommer Lawrence & Haug LLP; William S. Frommer

(57) ABSTRACT

A positioning information transmitting device for transmitting the current site data to a peripheral device(s) using wireless signals. The current side data, as the positioning information of the current site, calculated by a portable telephone signal positioning processor 20 or a GPS unit 30, is transmitted to a CPU 12 through an interfacing (I/F) unit 11. The positioning information transmitting device 10 includes a local wireless communication unit 40 for transmitting/receiving data to or from the peripheral device(s). The current side data is transmitted from a CPU 12 through a communication controller 13 so as to be processed by a baseband processor 41 of the local wireless communication unit 40. The so processed data is superposed by an RF processor 41 on a carrier wave so as to be transmitted over a wireless path to a peripheral device(s) from a local wireless communication antenna 43.

14 Claims, 22 Drawing Sheets

U.S. PATENT DOCUMENTS

| | | | | |
|---|---|---|---|---|
| 2004/0185830 A1* | 9/2004 | Joao et al. | ............... | 455/410 |
| 2004/0199474 A1* | 10/2004 | Ritter | ............... | 705/65 |
| 2004/0209627 A1* | 10/2004 | Shiraga | ............... | 455/456.1 |
| 2004/0215964 A1* | 10/2004 | Barlow et al. | ............... | 713/172 |
| 2005/0037872 A1* | 2/2005 | Fredlund et al. | ............... | 473/407 |
| 2005/0054290 A1* | 3/2005 | Logan et al. | ............... | 455/41.2 |

OTHER PUBLICATIONS

Patent Abstracts of Japan, 09-096670 published on Apr. 8, 1997.

Patent Abstracts of Japan, 07-064169 published on Mar. 10, 1995.

* cited by examiner

FIG. 8

(1) LATITUDE LONGITUDE TIME REQUEST (XML)

```
< request >
    < item > position, time < /item >
    < unit > degree < /unit >
< /request >
```

(2) LATITUDE LONGITUDE TIME INFORMATION (XML)

```
< format >
    < datum > wgs84 < /datum >
    < unit > degree < /unit >
< /format >
< pos >
    < lat > 35.7611 < /lat >
    < lon > 139.7700 < /lon >
< /pos >
< postime >
    < area > Japan < /area >
    < date > 2001.03.15 < /date >
    < time > 10:05AM < /time >
< /postime >
```

(a) DATA FORMAT OF SITE TRAJECTORY RECORD DATA

| RECORD | TAG | ITEMS | | | | | | | |
|---|---|---|---|---|---|---|---|---|---|
| HEADER | $ > HDR | VERSION | LETTER/CHARACTER CODE | POSITIONING SYSTEM | RECORDING DEVICE | | | | |
| DATA | $ > EPD | DATE-TIME | LATITUDE | LONGITUDE | ALTITUDE | SPEED | HEADING | | |

(b) SAMPLES OF SITE TRAJECTORY RECORD DATA $ > HDR,1.00,Shift_JIS,tokyo,"Position System"
$ > EPD,2000/07/21/5-09:05:15+09:00,+35.63350,+139.76597,+00051,60,110
$ > EPD,2000/07/21/5-09:05:25+09:00,+35.63281,+139.76800,+00051,60,110
$ > EPD,2000/07/21/5-09:05:35+09:00,+35.63211,+139.77008,+00048,55,105
$ > EPD,2000/07/21/5-09:05:45+09:00,+35.63161,+139.77269,+00042,48,85
$ > EPD,2000/07/21/5-09:05:55+09:00,+35.63225,+139.77508,+00038,40,75

FIG.10

POSITIONING INFORMATION TRANSMITTING DEVICE AND POSITIONING INFORMATION TRANSMITTING/RECEIVING SYSTEM

BACKGROUND OF THE INVENTION

1. Field of the Invention

This invention relates to a positioning information transmitting device for transmitting the positioning information obtained on positioning the current site, to a near-by device(s), and to a positioning information transmitting/receiving system comprised of the positioning information transmitting device and the near-by device(s).

2. Background of the Invention

Up to now, there has been known such a technique for measuring the current site by the global positioning system (GPS) or based on base station signals for a portable telephone set. Such device employing this technique to calculate the current site for practical application has already been commercialized.

The positioning technique by GPS uses C/A (Coarse/Acquisition) codes contained in L1 electrical waves, sent from three or more of 24 satellites performing orbital movements at an altitude of approximately 20,000 km, with a carrier frequency of 1575.42 MHz, to find the distance between a moving object and the satellites to calculate the position of the moving object.

As disclosed in Japanese Laying-Open Patent Publication 2001-45549 or Japanese Laying-Open Patent Publication H-10-322752, the technique of calculating the current site based on received base station signals for a portable telephone set calculates the distance between the base station and the moving object, based on the phase difference of the electrical waves, and calculates the current site by trigonometrical survey on the basis of the calculated distance.

However, the majority of the currently commercialized devices include a unit for measuring the current site, enclosed therein, while it has not been attempted to transmit the positioning information to other devices.

There is presently used a current site measurement unit of the type in which current site data is transmitted by cable communication, such as USB, PC card or serial communication, to a main body device, such as PC or car navigation system. However, this measurement unit communicates with the main body device in the relationship of one-for-one correspondence, such that the current site information is not exchanged with a main body device not paired with respect to the current site measurement unit. Even if the current site data is transmitted to such main body device not paired with respect to the current site measurement unit, there persist complexities that, since cable communication is used, the current site measurement unit must be connected to the main body device over a cable.

SUMMARY OF THE INVENTION

It is therefore an object of the present invention to provide a positioning information transmitting device which is able to transmit current site data to near-by devices using wireless signals.

It is another object of the present invention to provide a positioning information transmitting/receiving system whereby a user owning a device in the neighborhood of the positioning information transmitting device may enjoy an added benefit.

In one aspect, the present invention provides a positioning information transmitting device including current site positioning means for positioning the current site to obtain the positioning information, and wireless communication means for transmitting the positioning information obtained by the current site positioning means to outside.

In another aspect, the present invention provides a positioning information transmission/reception system including a positioning information transmitting device made up by current site positioning means for positioning the current site to obtain the positioning information and by wireless transmission means for transmitting the positioning information obtained by the current site positioning means to outside, and a device made up by wireless communication means for receiving wireless signals indicating the positioning information transmitted by the positioning information transmitting device and by converting means for converting the positioning information of the wireless signals received by the wireless communication.

In still another aspect, the present invention provides a positioning information transmitting method including a step of positioning the current site to obtain the positioning information, and a step of transmitting the positioning information obtained by the current site positioning means on a wireless path to outside.

In yet another aspect, the present invention provides a positioning information transmitting program including a step of positioning the current site to obtain the positioning information, and a step of transmitting the positioning information obtained by the current site positioning means on a wireless path to outside.

In the positioning information transmitting device according to the present invention, in which wireless communication means transmits the positioning information, acquired by the current site positioning means, in the form of wireless signals, current site data can be sent to plural devices, thus dispensing with costs involved in having the positioning information transmitting device enclosed in the main body device. On the other hand the user may be relieved of complexities involved in cable re-mounting. Moreover, the positioning information transmitting device, enclosed in a one-for-one correspondence relationship in or connected over a cable to the main body device may be an independent positioning unit.

In addition, in the positioning information transmitting system according to the present invention, in which the positioning information, sent from the positioning information transmitting device, is received by wireless communication means of the device, and formed by conversion means into place names, time and/or the site display information on a map, the user owning a device may enjoy an added value.

BRIEF DESCRIPTION OF THE DRAWINGS

FIG. 8 shows exemplary data of communication between the positioning information transmitting device and a digital camera.

FIG. 10 shows a specified example of movement trajectory data recorded by the positioning information transmitting device on a memory card 3.

DESCRIPTION OF THE PREFERRED EMBODIMENTS

Figure 1:
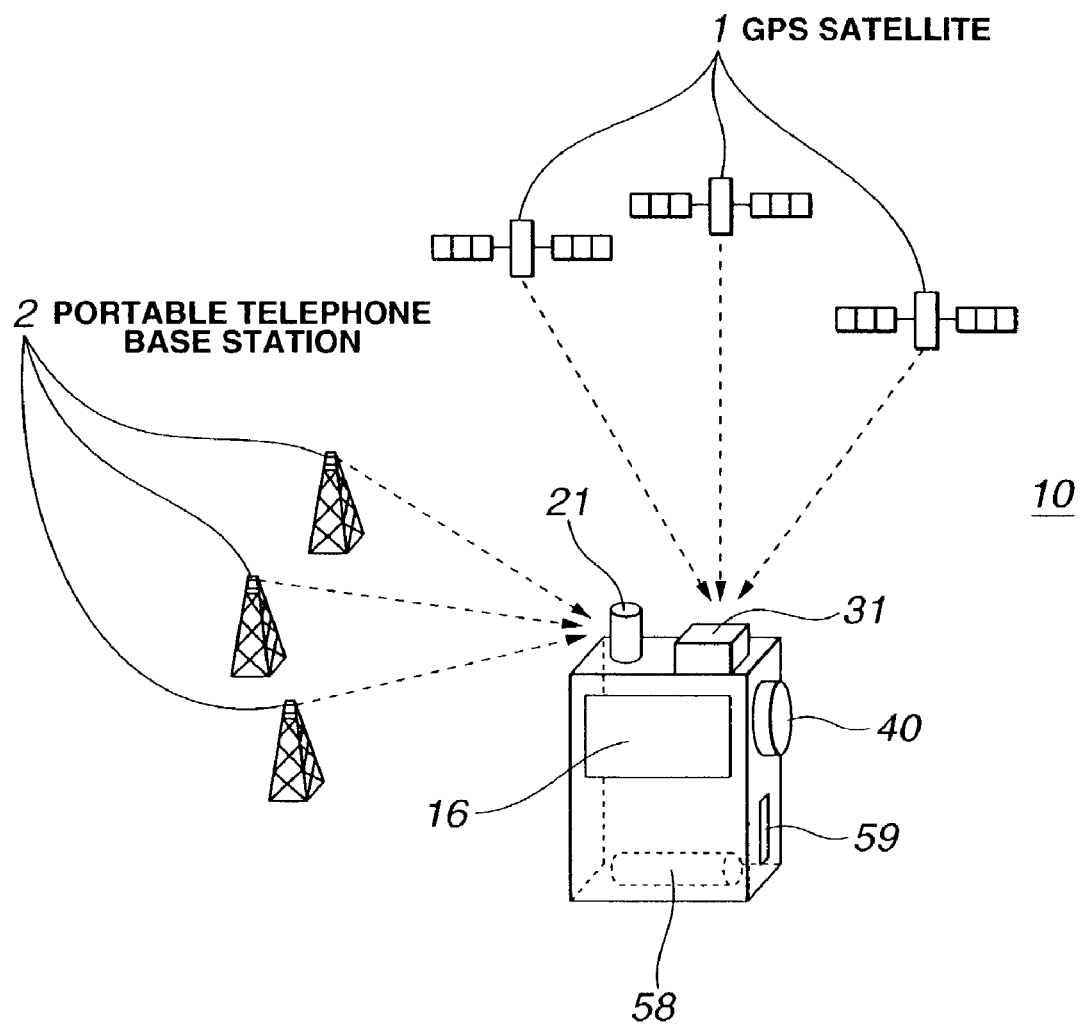
FIG. 1 illustrates the appearance and schematic functions of a positioning information transmitting device.

Referring to FIGS. 1 to 22, certain preferred embodiments of the present invention will be described in detail.

In the following, a positioning information transmitting device 10, a positioning information transmitting/receiving system 70, made up by the positioning information transmitting device 10 and a peripheral device(s), and a digital camera 80 as well as a portable information terminal device 100, as the peripheral devices, are now explained. A portable telephone set 130, having enclosed the function as the positioning information transmitting device, and a portable information terminal device 170, similarly having enclosed the function as the positioning information transmitting device, are also explained.

The positioning information transmitting device 10, the appearance of which is shown in FIG. 1, is a portable device, and has enclosed a function of receiving GPS signals from a GPS satellite 1 and a function of receiving base station signals from a portable telephone base station 2. The function of receiving GPS signals includes a GPS antenna 31, while the function of receiving signals of portable telephone base stations for site measurement includes a portable telephone communication antenna 21.

The positioning information transmitting device 10 includes a battery 58 for driving an equipment, a local wireless communication unit 40 having a local wireless function of transmitting current site data to a peripheral device(s), as later explained, and an insertion opening (slot) for a memory card used for recording movement trajectory data 59.

The positioning technique by GPS uses C/A (Coarse/Acquisition) codes, contained in L1 electrical waves, with the carrier frequency of 1575.42 MHz, transmitted from three or more of 24 satellites performing orbital movements at an altitude of 20,000 km, to find the distance between a moving object and the satellites to calculate the position of the moving object.

As disclosed for example in Japanese Laying-Open Patent Publication 2001-45549 or Japanese Laying-Open Patent Publication H-10-322752, the technique of calculating the current site by receipt of signals from the portable telephone base station calculates the distance between the base station and the moving object, based on the phase difference of electrical waves, and calculates the current site by trigonometric survey based on this distance.

For example, in a moving object communication system, disclosed in Japanese Laying-Open Patent Publication No.2001-45549, there is shown a technique in which a mobile device, desiring to acquire the position information, receives an announcing channel, periodically transmitted from a base station, acquires the contents and the reception timing of the announcing channel and retrieves a database to add a new source of transmission if such has not already been registered. If the acquisition of the transmission timing of the announcing channel is further needed, the transmission timing is acquired. From the transmission timing and the receipt timing of the announcing channel, propagation delay of the announcing channel or the difference in propagation delay among plural period announcing channels is calculated. The position information of the mobile device is calculated and output based on the propagation delay or on the difference in propagation delay.

In a mobile station position estimation method, base station device and the mobile station device, in cellular mobile communication, as disclosed in Japanese Laying-Open Patent Publication H-10-322752, there is shown a technique in which a mobile station device converts a first intrinsic signal sequence PN1 from a PN1 generator into a preset format by a transmission signal processing unit to transmit the converted signal as a position estimating reference signal from a transmitter to a base station device, which base station device then transmits a second intrinsic signal sequence PN2 from a PN2 generator to a mobile station, in synchronism with the first intrinsic signal sequence PN1 as sent to a receiver, with the mobile station causing its phase comparator to compare the first intrinsic signal sequence PN1 as sent to the second intrinsic signal sequence PN2 as received to find a phase difference therebetween to calculate an estimated distance between the base station and the mobile station based on the phase difference to estimate the mobile station position.

The wireless technique by the local wireless function refers to a wireless communication employing the same ISM (Industrial, Scientific and Medical) range of 2.4 GHz frequency as that used in for example direct sequence spread spectrum (DSSS) wireless communication, and is termed Bluetooth. By and large, this wireless technique is suited for transmitting data to another device within a distance of 10 m or less.

The memory card refers to e.g., Memory Stick (trademark) which is now finding extensive use as a storage medium for a digital camera or a notebook PC. This memory card has loaded therein a non-volatile flash memory, and is able to hold data, while allowing data to be read out therefrom.

Figure 2:
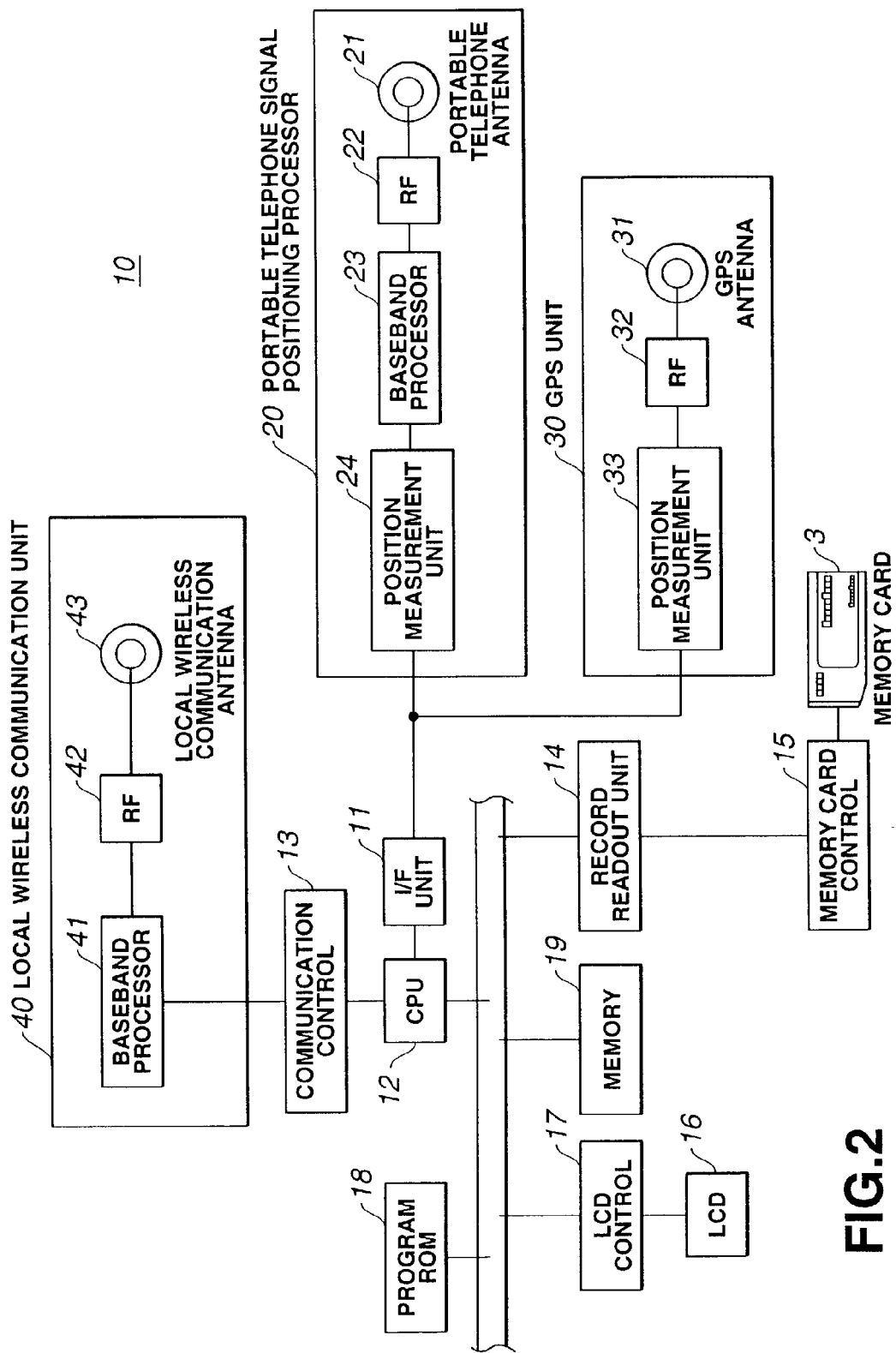
FIG. 2 is a block diagram showing an inner structure of the positioning information transmitting device.

FIG. 2 is a block diagram of the positioning information transmitting device 10.

The positioning information transmitting device 10 includes a portable telephone signal positioning processor 20, which receives signals for a portable telephone set for positioning the current site, as a specified instance of the function of receiving base station signals from the portable telephone base station 2 for site measurement as described above. The portable telephone signal positioning processor receives electrical waves from the portable telephone base station 2 by a portable telephone antenna 21 and extracts signals by its RF processor 22 to process the so extracted signals by its baseband processor 23. The portable telephone signal positioning processor measures the phase difference of the processed signals by a site measurement unit 24 to calculate the latitude and the longitude of the current site as the positioning information.

The positioning information transmitting device 10 also includes a GPS unit 30, which receives GPS signals from the GPS satellite 1 for measuring the current site, as a specified instance of the function of receiving the GPS signals from the GPS satellite 1. The positioning information transmitting device extracts signals by an RF processor 32 from the electrical waves received by the GPS antenna 31 to calculate the latitude, longitude and the altitude of the current site and the current time as the positioning information by its site measurement unit 33.

The current site and time data, as the positioning information for the current site, calculated by the portable telephone signal positioning processor 20 and by the GPS unit 30, are delivered through an interfacing unit (I/F) unit 11 to the CPU 12.

The positioning information transmitting device 10 includes a local wireless communication unit 40 capable of transmitting/receiving data to or from peripheral device(s). The aforementioned current site data, attempted to be transmitted by the positioning information transmitting device 10, is transmitted from the CPU 12 through a communication controller 13 so as to be processed by a baseband processor 41 of the local wireless communication unit 40. The so processed signals are superposed on a carrier wave in an RF unit 42 and processed in a baseband signal processor 41 so as to be transmitted through local wireless communication antenna 43 to the peripheral device(s). The electrical wave transmitted over a radio path from the peripheral device(s) is received by the local wireless communication antenna 43 to undergo signal extraction in the RF unit 42 followed by signal processing by the baseband signal processor 41. The resulting signal is transmitted through communication controller 13 to the CPU 12.

The positioning information transmitting device 10 also includes a record readout unit 14 for recording/reading out data on or from the memory card 3, such that data of a movement trajectory, left as action log as later explained, is written from the CPU 1 through the recording readout unit 14 and a memory card controller 15 in the memory card 3. Conversely, data may also be read out by the CPU 12 from the memory card 3.

Figure 3:
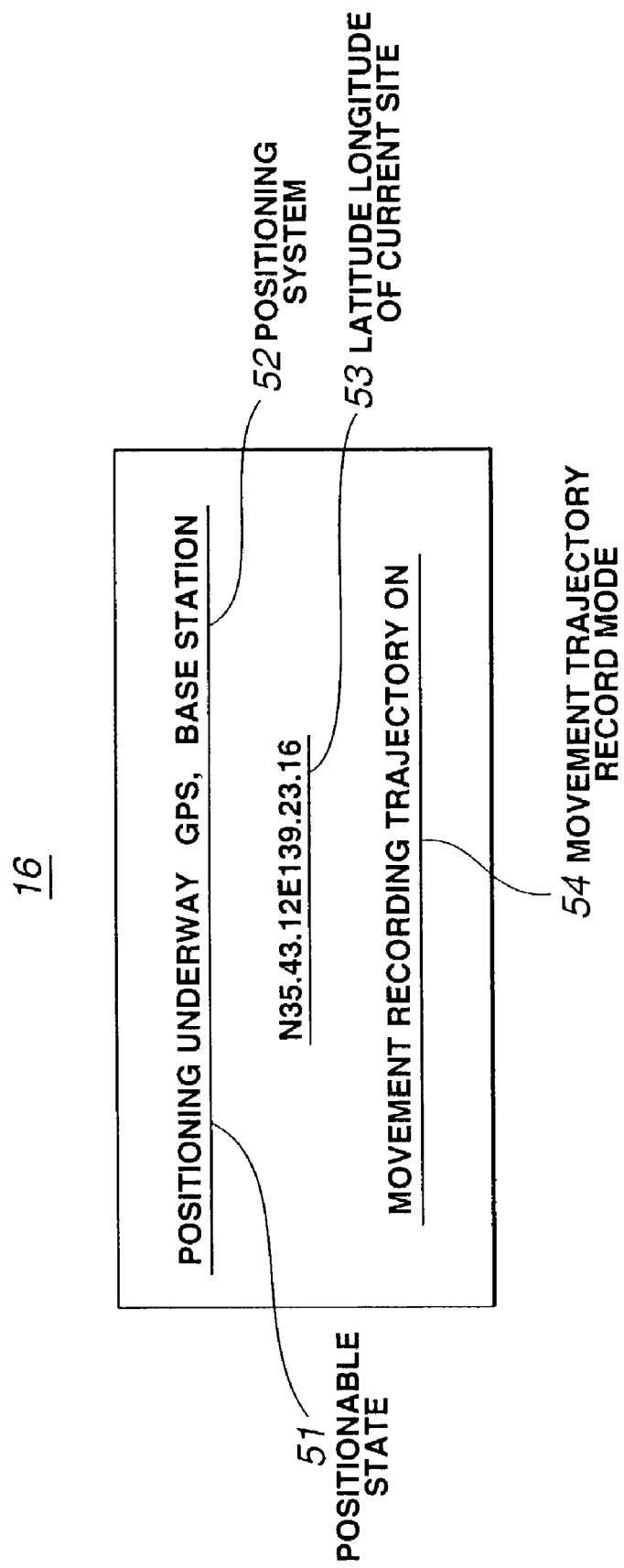
FIG. 3 shows a display instance of the positioning state represented by the positioning information transmitting device on an LCD display unit.

The positioning information transmitting device 10 also includes an LCD 16 for displaying the positioning state, such that display data may be demonstrated as necessary on the LCD 16 from the CPU 12 through an LCD controller 17. A specified instance of display data on the LCD 16 is shown in FIG. 3, in which a positioning possible state 51 is indicated as [positioning under way], while a positioning system 52 is indicated as [GPS and/or base station]. The latitude longitude information 53 of the current site is indicated as [N35.43.12, E139.23.16], while a movement trajectory recording mode 54 is indicated as [movement trajectory recording ON].

The positioning information transmitting device 10 also has stored therein a program ROM 18 in which are stored an operating system (OS), and an application software executed next to this OS, specifically, such programs for measuring the current site, subsequently transmitting site data to a requesting device and also for recording a movement trajectory in a memory card. These programs are read out by the CPU 12 to a memory 19 so as to be executed with the memory 19 as a work area.

Figure 4:
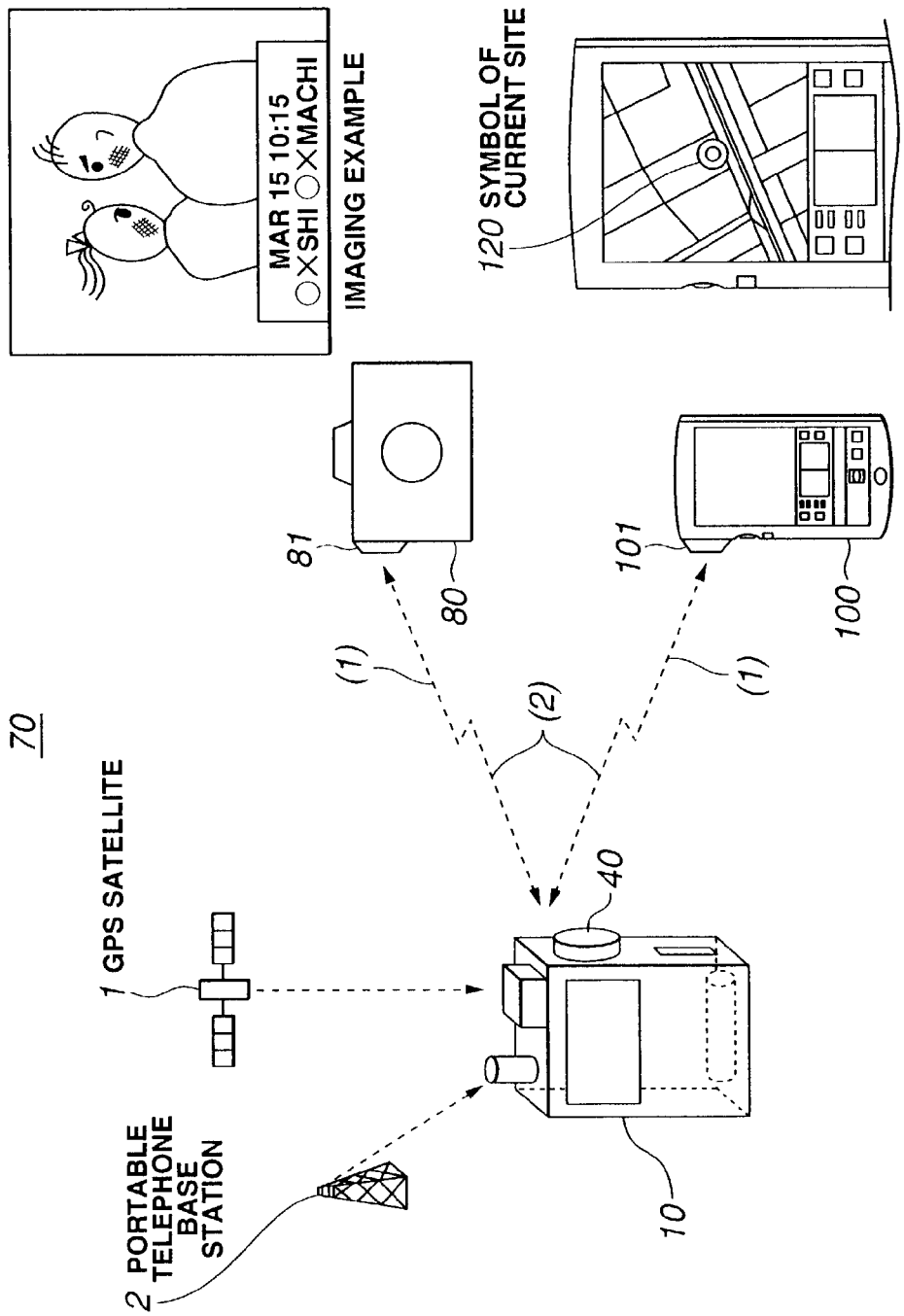
FIG. 4 shows constituent elements of a positioning information transmitting/receiving system.

FIG. 4 shows a positioning information transmitting/receiving system 70 in which the positioning information transmitting device 10 is responsive to a request from another peripheral device to transmit data of the current site as positioned to peripheral devices and in which the devoice which has received the data executes a unique application depending on the current site. This is a specified instance of the positioning information transmitting/receiving system, which is made up by the positioning information transmitting device 10, a digital camera 80 and a portable information terminal device 100 (Personal Digital Assistants or PDA).

The digital camera 80 or the portable information terminal device 100 requests current site and time data, as the aforementioned positioning information, to the positioning information transmitting device 10, as necessary, through a local wireless transmitter 81 or a local wireless communication unit 101 (1). On receipt of the request, the positioning information transmitting device 10 receives signals from the GPS satellite 1 or the portable telephone base station 2 to calculate the current site and the current time. The so calculated current site and time data are again sent through the local wireless communication unit 40 to the peripheral device which has made the request (2). When the movement trajectory recording mode is ON, the positioning information transmitting device 10 records the current site and time data on the memory card 3.

Figure 5:
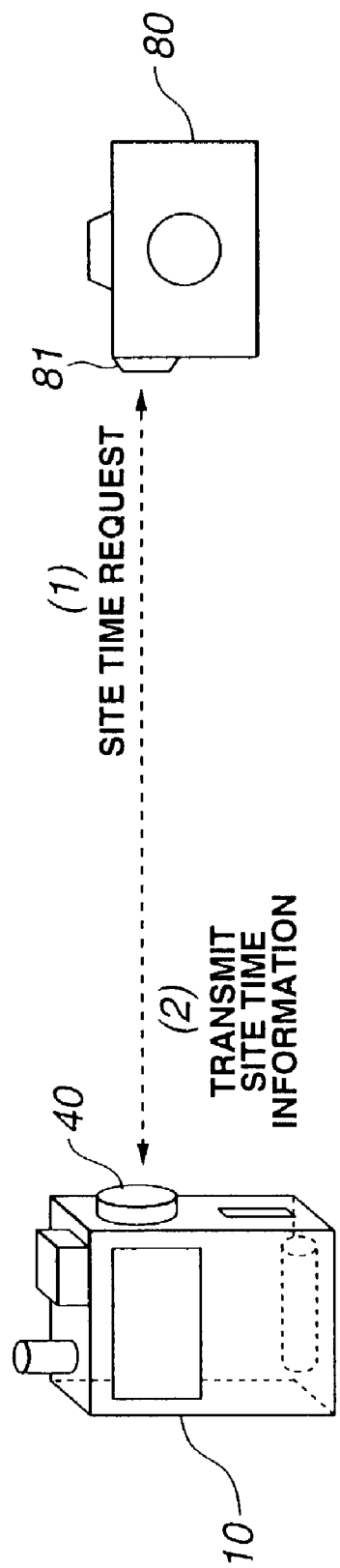
FIG. 5 illustrates the processing carried out between the positioning information transmitting device and a digital camera in the positioning information transmitting/receiving system.
Figure 6:
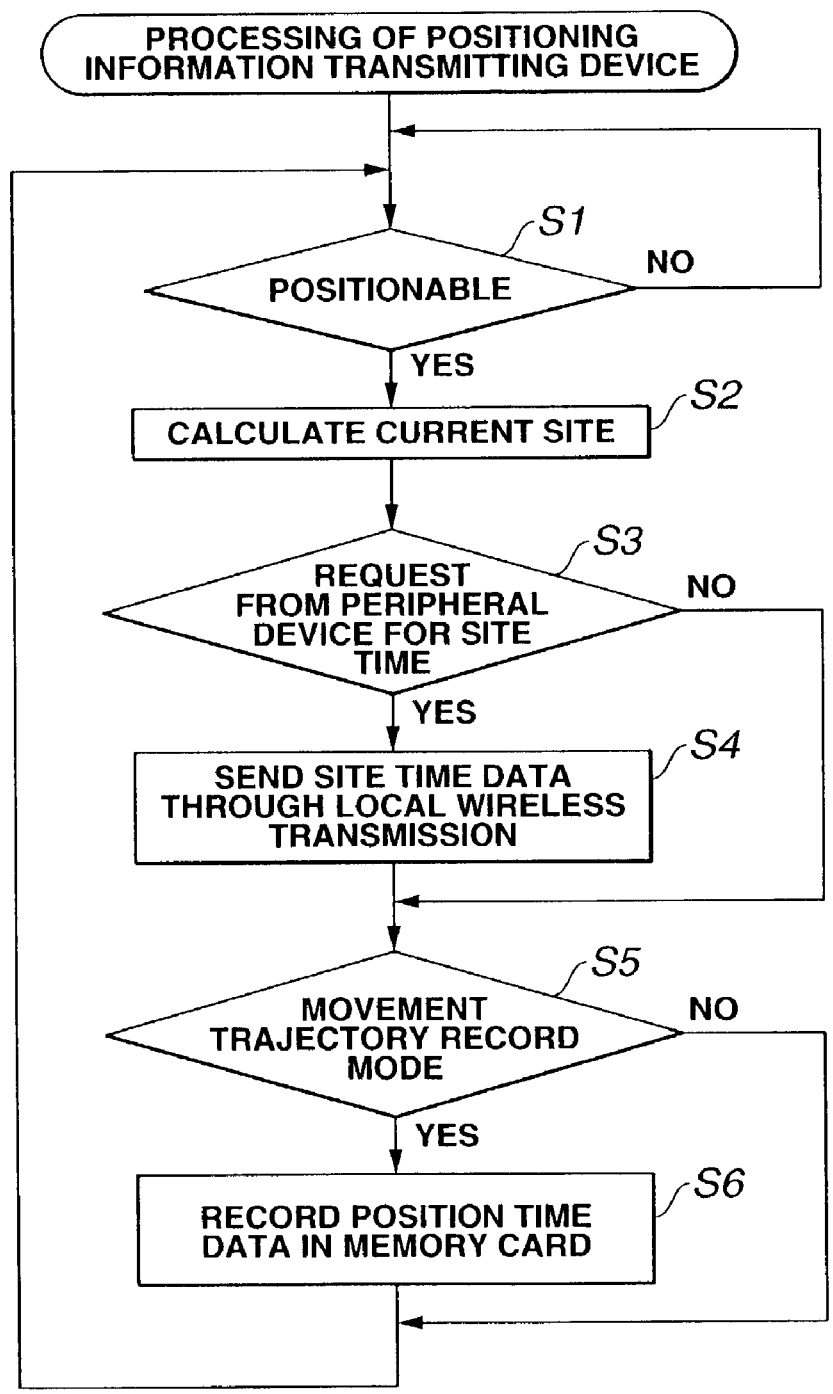
FIG. 6 is a flowchart showing the processing by the positioning information transmitting device in the positioning information transmitting/receiving system.

Referring to the flowchart of FIG. 6, the processing executed between the positioning information transmitting device 10 and the digital camera 80 in the positioning information transmitting/receiving system 70, as shown in FIG. 5, is explained. Here, the processing of the positioning information transmitting device 10 transmitting the position and time information (2) responsive to the position and time data request (1) from the digital camera 80 is explained. This processing is realized as a result of an application program corresponding to the flowchart being read out from the program ROM 18 to the RAM 19 by the CPU 12 and being then executed with the RAM 19 as the work area.

First, the positioning information transmitting device 10 at step S1 checks whether or not positioning is feasible. If the positioning is feasible (YES), the positioning information transmitting device 10 proceeds to step S2 to calculate the current site by the aforementioned GPS unit 30 and/or the portable telephone signal positioning processor 20.

The reason the current site has been stated as being calculated by the GPS unit 30 and/or the portable telephone signal positioning processor 20 is that the positioning information transmitting device 10 is portable and hence only one of them is usable depending on the location of movement or on the signal receiving state, and also that, if both are usable, the user may be allowed to select one of them, or an average value of the current site data or the time data as obtained with the GPS unit and the portable telephone signal positioning processor may be used.

If it is determined at step S3 that a request for site or time data (1) has been made from the peripheral device (digital camera 80) (YES), the positioning information transmitting device proceeds to step S4 to transmit site and time data (2) through the local wireless communication unit 40.

If it is determined at step S5 that the movement trajectory recording mode has been selected, the positioning information transmitting device at S6 records position and time data in the memory card. The positioning information transmitting device then reverts to step S1.

If it is determined at step S3 that no request has been made of the site or time data (1) from the peripheral device (digital camera 80) (NO), the positioning information transmitting device proceeds to the aforementioned step S5.

If it is determined at step S5 that the movement trajectory recording mode of leaving the movement trajectory data as action log has not been selected, the positioning information transmitting device skips the step S6 to revert to step S1.

In this manner, the positioning information transmitting device 10 sends the site or time information (2) responsive to the site or time data (1) from the digital camera 80. The digital camera 80 is able to add the transmitted site or time information to the photographed image. The positioning information transmitting device 10, on the other hand, is able to record the movement trajectory on the memory card.

Figure 7:
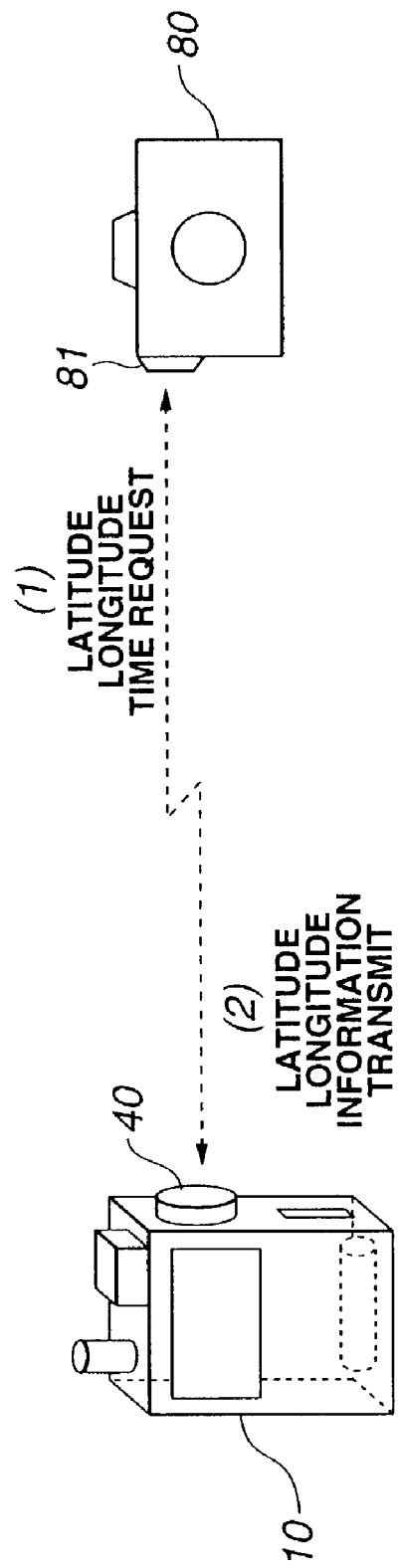
FIG. 7 shows a specified example of processing carried out between a positioning information transmitting device and a digital camera in the positioning information transmitting/receiving system.

The processing of the positioning information transmitting device 10 transmitting the information on the latitude, longitude and the time, as a specified example of the aforementioned site or time data, responsive to a request from the digital camera 80, is explained with reference to FIGS. 7 and 8. This processing is carried out by the flow up to step S4 of the flowchart of FIG. 6.

First, the positioning information transmitting device 10 through steps S1 and S2 calculates the information on the latitude, longitude and the time of the current site by the aforementioned GPS unit 30 and/or the portable telephone signal positioning processor 20. If it is determined at step S3 that a request for the information on the latitude, longitude and the time (1) has been received from the digital camera 80, as shown in FIG. 7, the positioning information transmitting device 10 sends the information on the latitude, longitude and the time (2) through the local wireless communication unit 40.

Referring to FIG. 8, data exchanged uses XML (Extensible markup language). For example, the requesting party expresses an item of requesting the latitude longitude time (1) as an item of request <request> and specifies the latitude longitude unit by a <unit> tag to send these tags.

Responsive to this request, the positioning information transmitting device 10 sends to the digital camera 80 the latitude longitude time information (2), similarly employing the XML, as the positioning system of the latitude and the longitude, the latitude and longitude unit, the latitude and longitude, and positioning date and time of measurement, are expressed by a <datum> tag, a <unit> tag, a <pos> tag and by a <postime> tag, respectively.

Figure 9:
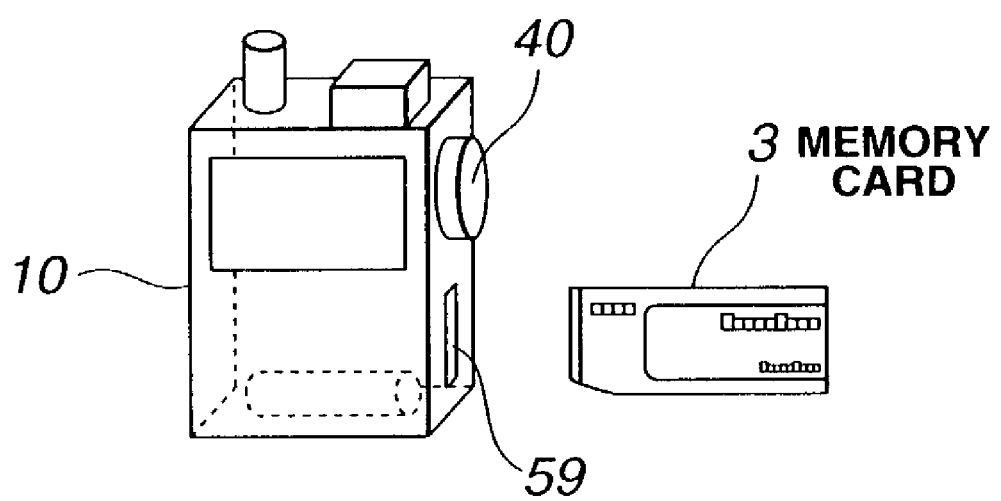
FIG. 9 shows a memory card inserted into a memory card inserting slot of the positioning information transmitting device.

A specified instance of movement trajectory data, recorded on the memory card 3, inserted into the memory card inserting opening (slot) 59 of the positioning information transmitting device 10, as shown in FIG. 9, is explained with reference to FIG. 10.

The movement trajectory data is stored as a data file in the memory card 3. FIG. 10a shows a data format of the movement trajectory recording data. In the leading end of the file is arranged a record, which is termed a header, indicated by a tag $>HDR, and which gives the meaning to the entire file, such as version, letter or character code, positioning system or the recording device. The header is followed by a record, which is termed data, indicated by a tag $>EPD, and which states the positioning date and time, latitude, the longitude and the altitude of the current site, the movement speed and the proceeding direction (heading).

FIG. 10b shows a sample of position trajectory recording data. In the leading end is arranged a header, indicated by a tag $>HDR, with the version "1.00", letter codes "Shift_JIS", measurement system "Tokyo" and with the recording device "positioning system" as items. The header is followed by data indicated by a tag $>EPD, with the date and time "2000/07/21/5-09:05:15+0.9:00 (time difference from the Greenwich Time", latitude "+35.63350", longitude "+139.76597", altitude "00051", speed "60" and the heading "110" as items.

The movement trajectory data, thus recorded on the memory card 3 in the positioning information transmitting device 10, may be left as action log.

An exemplary application of the digital camera 80, which has received the current site and time data from the positioning information transmitting device 10 by local wireless communication, is hereinafter explained.

Figure 11:
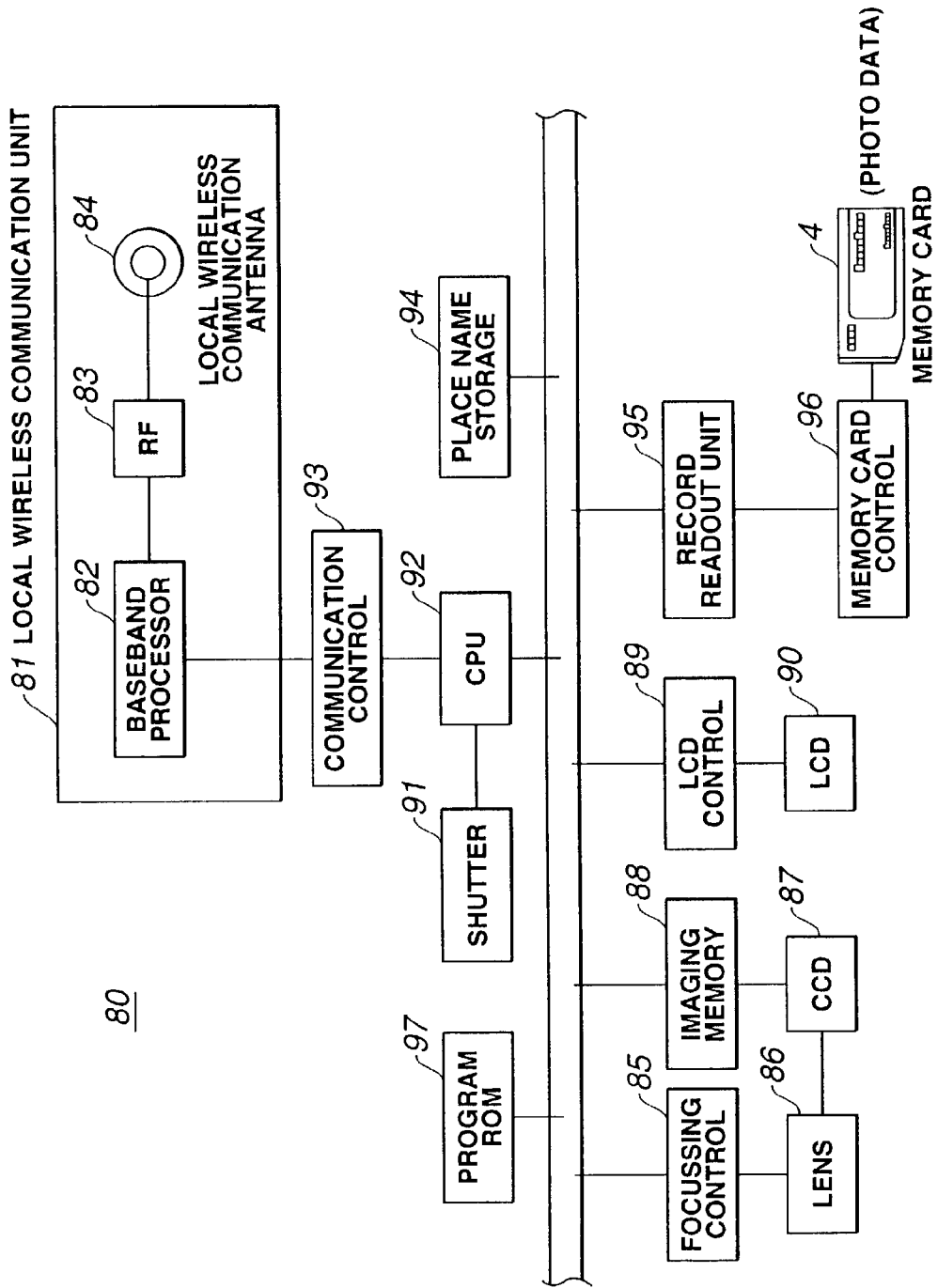
FIG. 11 is a block diagram showing an inner structure of a digital camera.

FIG. 11 shows the structure of the digital camera 80. An image of an object, photographed by a lens 86, adjusted for focussing by a focussing controller 85, is recorded by a CCD 87 in the form of digital signals as image data on an imaging memory 88. This image is demonstrated by an LCD controller 89 on an LCD 90. The user confirms this and acts on a shutter 91.

The digital camera 80 also includes a local wireless communication unit 81, for receiving current site data from the positioning information transmitting device 10, a place name data storage unit 94 for printing the place name of a photographing site on a photographic image, a record readout unit 95 for recording the acquired photographic image on a memory card 4, and a memory controller 96.

The digital camera 80 also includes a CPU 92 for controlling the operation of various portions over an internal bus. For example, a request signal issued by the digital camera 80 is transmitted from the CPU 92 through the communication controller 93, processed by a baseband processor 82 of the local wireless transmitter 81 and superposed on the carrier wave by the RF processor 83 so as to be sent over a wireless route from a local wireless communication antenna 84 to the positioning information transmitting device 10. Conversely, the electrical waves, sent over a wireless path from the positioning information transmitting device 10, are received by the local wireless communication antenna 84 and extracted by the RF unit 83. The so extracted signals are processed by the baseband processor 82 so as to be transmitted through a communication controller 93 to the CPU 92.

Figure 13:
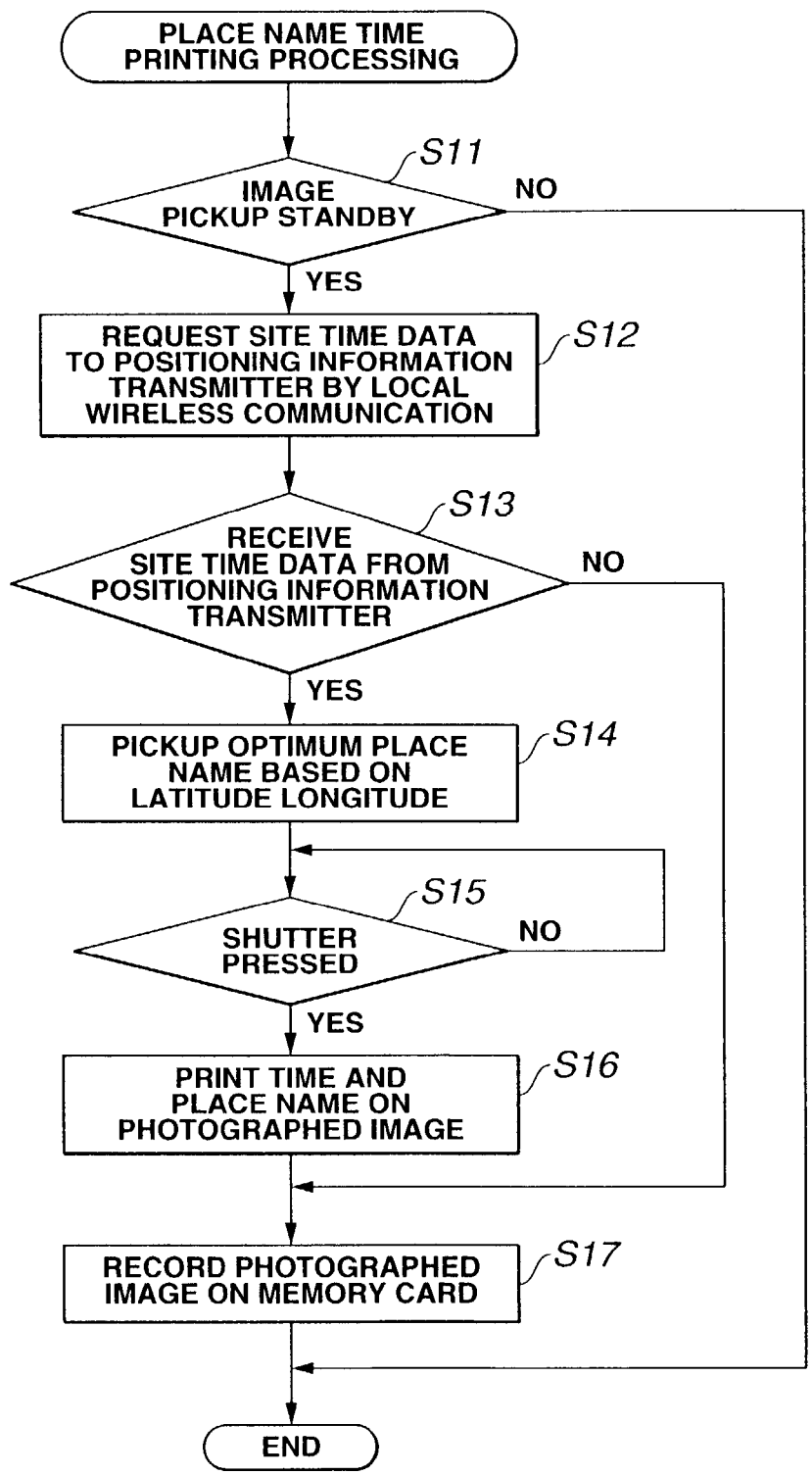
FIG. 13 is a flow chart showing the processing carried out in a digital camera in the positioning information transmitting/receiving system.

The digital camera 80 also includes an enclosed program ROM 97 in which there are stored an operating system (OS), and an application software executed next to this OS, specifically, an application for imaging an object, or an application for executing the processing on the side digital camera in the positioning information transmitting/receiving system. This application software may be exemplified by an application, the processing of which is to be explained in a flowchart shown for example in FIG. 13. Of course, the application, based on the flowchart of FIG. 13, is further subdivided into plural sub-applications, such as, for example, a sub-application of converting the current site data, received by the local wireless transmitter 81, to a place name, using the place name data storage unit 94, which will be subsequently explained. The CPU 92 has the function of converting the current site data into place names by the CPU 92 executing this application.

When in an imaging stand-by state, the digital camera 80 requests current site and time data to the positioning information transmitting device 10 through the local wireless transmitter 81. When the current site and time data is sent from the positioning information transmitting device 10, an optimum place name is picked up from place name data of the place name data storage unit 94, based on the latitude and longitude of the current site. On recognizing that the shutter 91 has been pressed, the CPU 92 prints the time and the place name in a lower portion of the photographed image in the image memory 88, while recording the photographed image on the memory card 4.

The processing on the side digital camera 80, between the digital camera 80 and the positioning information transmitting device 10 (shown in FIG. 12) in the positioning information transmitting/receiving system 70, is now explained using a flowchart shown in FIG. 13.

The processing is carried out by an application program conforming to this flowchart being read out from the program ROM 97 of FIG. 11 and being executed by the CPU 92.

First, on verifying at step S11 that the digital camera 80 is in an imaging stand-by state (YES), the CPU requests the current site and time data through the local wireless communication unit 81 to the positioning information transmitting device 10 at step 12.

On verifying that the current site and time data has been sent from the positioning information transmitting device 10 (step S13), the CPU 92 executes the application of changing the aforementioned current site data into place names, using the place name data storage unit 94, and proceeds to pick up an optimum place name from the place name data of the place name data storage unit 94, based on the latitude and the longitude of the current site (step S14).

Figure 12:
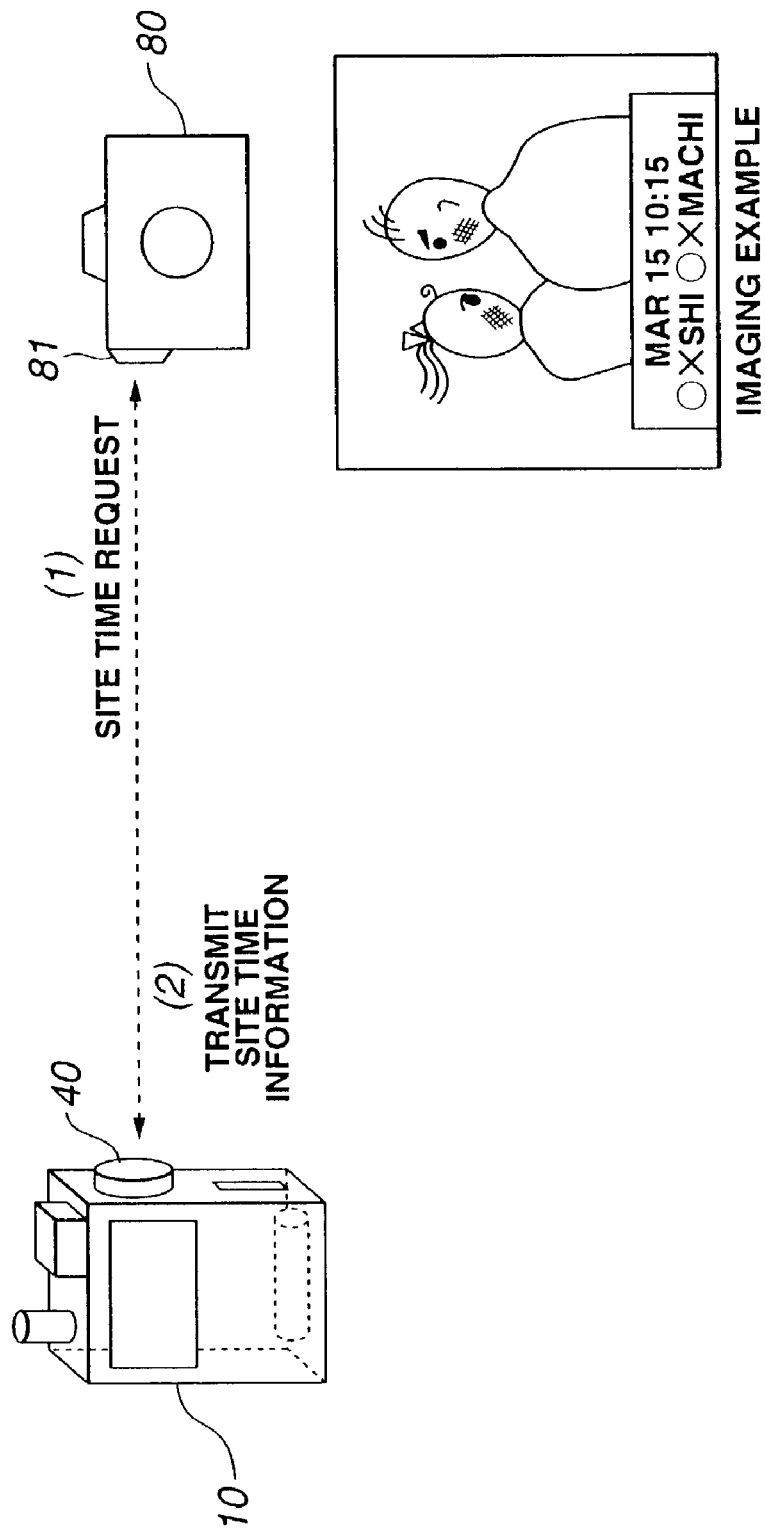
FIG. 12 illustrates communication between the positioning information transmitting device and the digital camera in the positioning information transmitting/receiving system.

On recognizing at step S15 that the user has selected the optimum place name, and that the shutter 91 as an enter key has been pressed (YES), the CPU 92 causes the time and the place name to be printed in a lower portion of the photographed image in the image memory 88 (step 16), while causing the photographed image to be recorded in the memory card 4 (step 17). FIG. 12 shows instances of imaging and letter or character printing. Although the time and the place names may be printed in the photographed image, these may also be associated with the photographed image and separately recorded in the memory card 4.

An application instance of the portable information terminal device (PDA) 100 which has received the current site and time data by local wireless communication from the positioning information transmitting device 10 is now explained.

Figure 14:
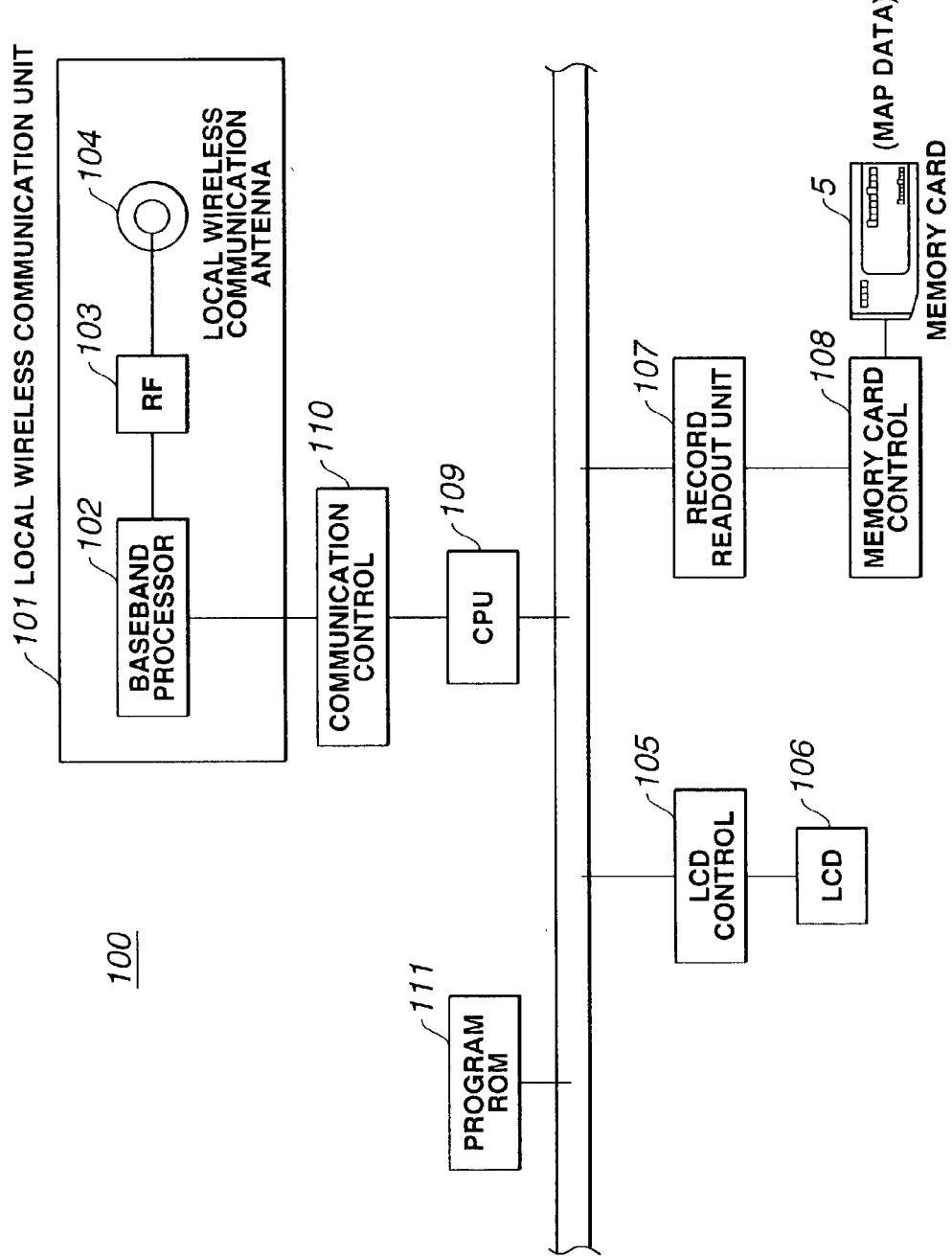
FIG. 14 is a block diagram showing an inner structure of a portable information terminal device.
Figure 15:
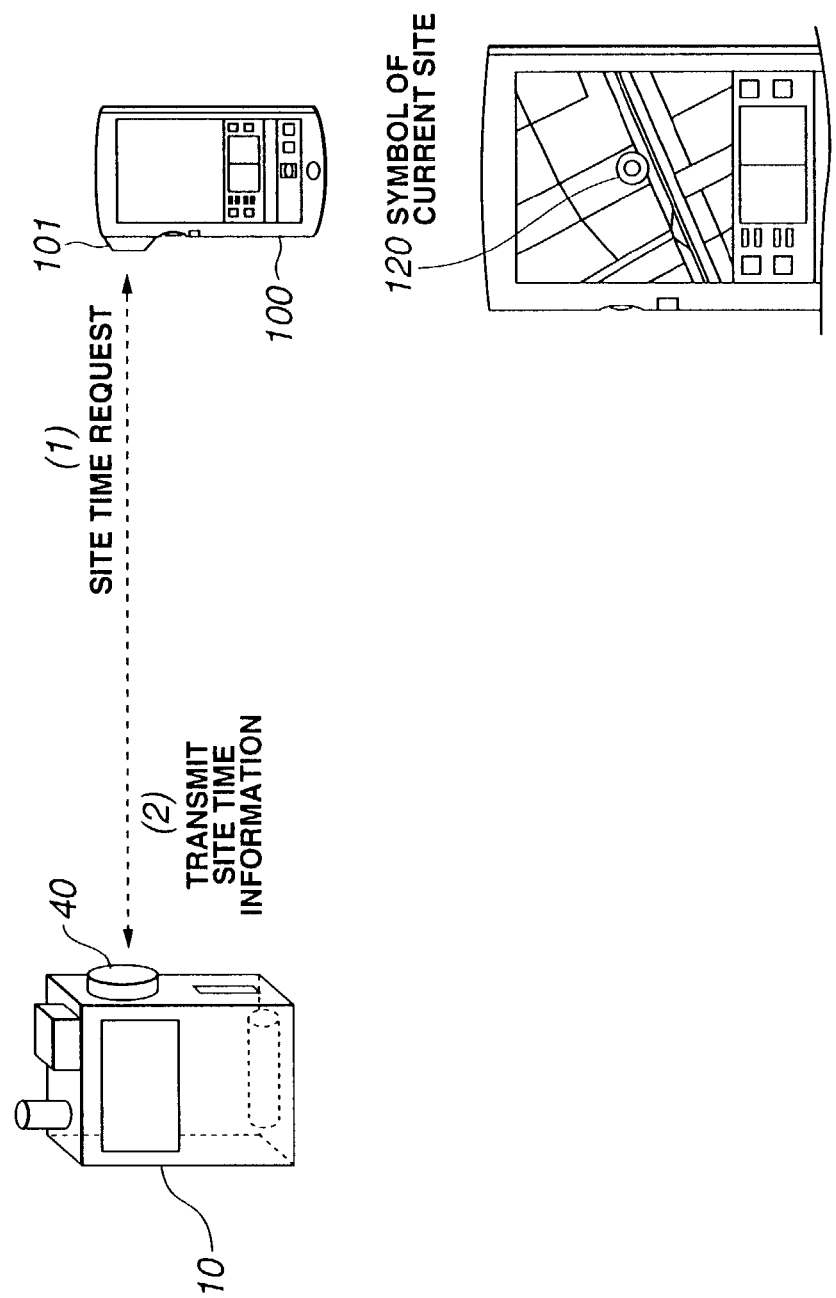
FIG. 15 illustrates the processing carried out between the positioning information transmitting device and the portable information terminal device in the positioning information transmitting/receiving system.

FIG. 14 shows the structure of the portable information terminal device 100.

The portable information terminal device 100 includes a local wireless communication unit 101 for receiving the current position data from the positioning information transmitting device 10.

The portable information terminal device 100 is provided with a CPU 109 for controlling the operation of various components over an internal bus. A request signal output by the portable information terminal device 100 is sent from the CPU 109 through a communication controller 110 so as to be processed by the baseband processor 102 of the local wireless communication unit 101. The so processed signal is superposed on a carrier signal by the RF processor 103 and transmitted over a wireless path from a local wireless communication antenna 104 to the positioning information transmitting device 10. Conversely, the electrical wave sent over the wireless path from the positioning information transmitting device 10 is received by a local wireless communication antenna 104 to undergo signal extraction in the RF processor 103. The resulting extracted signal is processed in the baseband processor 102 so as to be transmitted through the communication controller 110 to the CPU 109.

The portable information terminal device 100 also includes a program ROM 111 in which there are stored an operating system (OS) and an application software executed next to this OS, such as digital map display application. In the program ROM 111, there are also stored each application software for executing such functions as electronic schedule management, electronic address notebook, an electronic memo or an action list management, which are general PIM (Personal information management) functions, and an application for executing the processing on the side portable information terminal device in the positioning information transmitting/receiving system. There is further stored an application for converting the current site data received at the local wireless communication unit 101 into the site display information on the map, such as the current site symbol as later explained. By the CPU 109 executing this application, the CPU 109 has the function of converting the current site data into the site indicating information on the map.

The portable information terminal device 100 also includes an LCD 106 for displaying a map picture corresponding to the map information when the aforementioned digital map display application is executed on the CPU 109 and an LCD controller 105 for controlling this LCD 106.

The portable information terminal device also includes a record readout unit 107 for recording/reading out map data on or from a memory card 5, and a memory controller 107.

If, by user's selection, the aforementioned digital map display application is booted by the CPU 109 (map display mode), the portable information terminal device 100 requests current position data from the positioning information transmitting device 10 through the local wireless communication antenna 101. When supplied with current site data from the positioning information transmitting device 10, the portable information terminal device 100 causes a map including the latitude and the longitude of the current site to be displayed on the LCD 106, while causing the CPU 109 to act as converting means for converting the current position data into the display position information on the map, in such a manner as to display the user's current site as a current site symbol 120 on the map.

Figure 16:
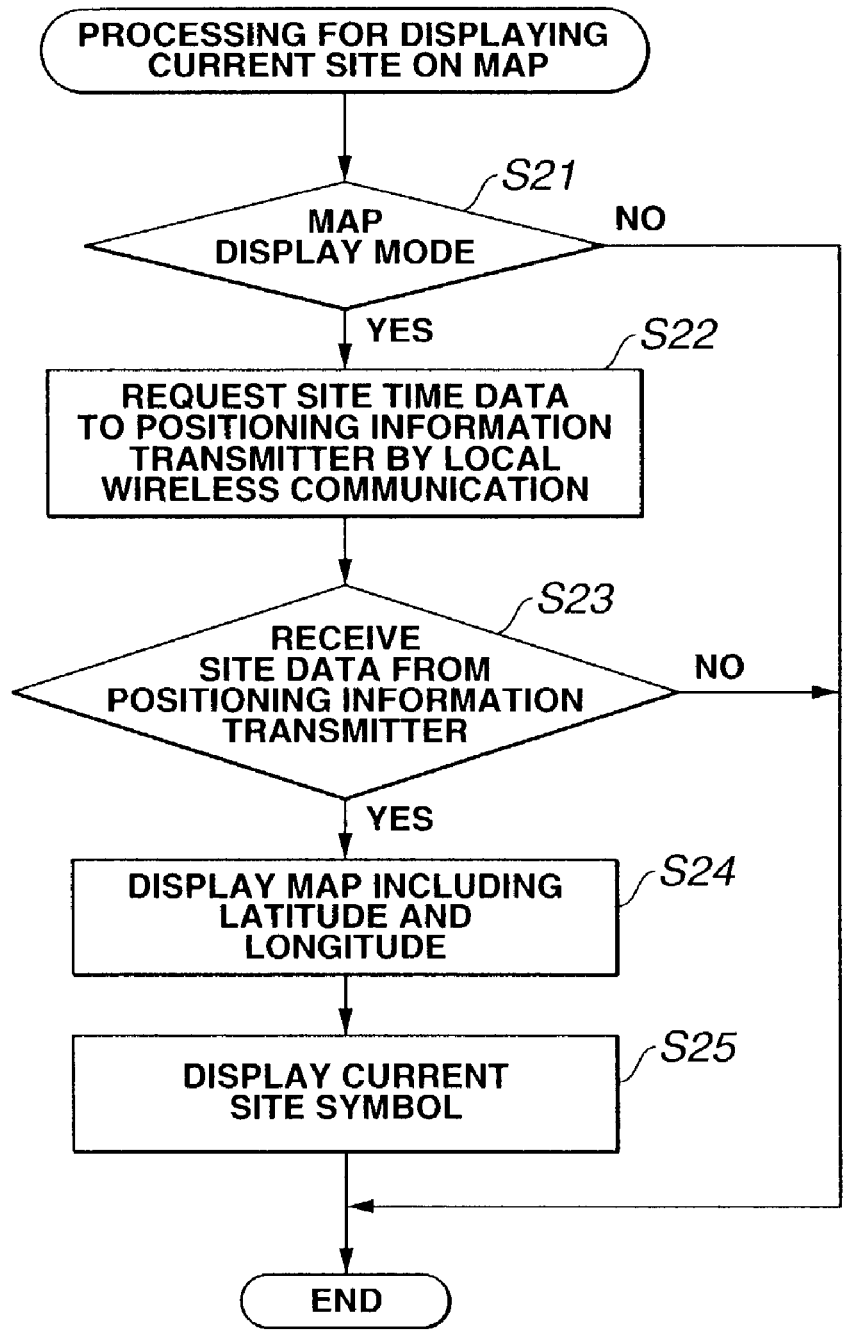
FIG. 16 is a flowchart for illustrating the processing carried out by the portable information terminal device in the positioning information transmitting/receiving system.

The processing on the side portable information terminal device 100, between the portable information terminal device 100 and the positioning information transmitting device 10 (shown in FIG. 15) in the positioning information transmitting/receiving system 70, is now explained using a flowchart shown in FIG. 16.

This processing is such processing executed as an application program consistent with the flowchart is read out by the CPU 109 from the program ROM 111.

First, when the map display mode is selected at S21 by the user, such that the display map display application is executed, the portable information terminal device 100 at step S22 requests position data from the positioning information transmitting device 10 through the local wireless communication unit 101. If it is determined at step S23 that the current site data has been sent from the positioning information transmitting device 10, the portable information terminal device 100 at step S24 displays a map including the latitude and the longitude of the current site on the LCD 106 to display the user's current site as a current site symbol 120 on the map, so that the aforementioned current site data will be converted into the display position information on the map (step S25).

Figure 17:
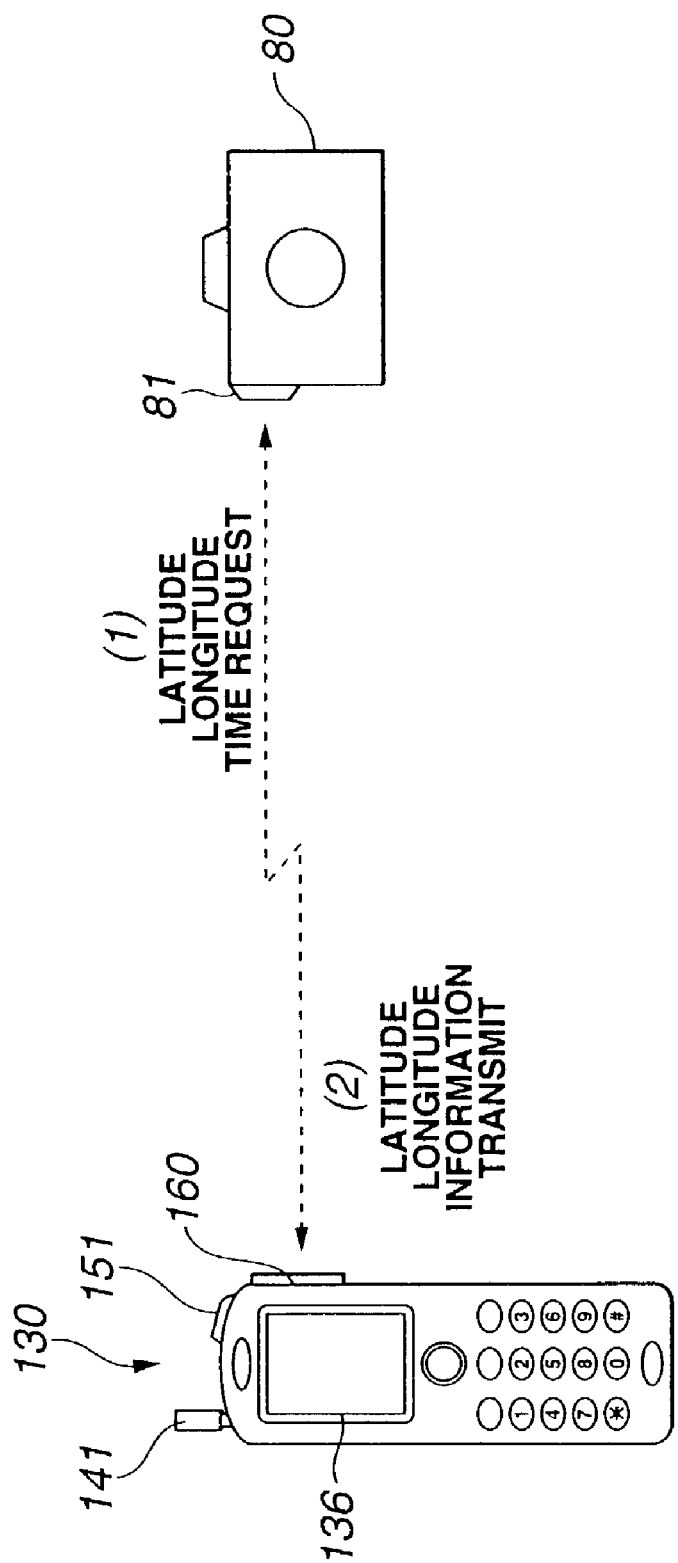
FIG. 17 illustrates schematics of communication in the positioning information transmitting/receiving system comprised of a potable telephone set having enclosed the function as the positioning information device and a digital camera.

It is noted that the positioning information transmission device of the present invention may also be enclosed in for example a portable telephone set, instead of being arranged as a sole device. FIG. 17 shows an instance of the positioning information transmitting/receiving system, comprised of a portable telephone set 130, having enclosed the function of the positioning information transmission device, and the digital camera 80. The portable telephone set 130 includes a portable telephone antenna 141, a GPS antenna 151 and a local wireless communication unit 160, in order to actually activate the function of the enclosed positioning information transmission device.

Figure 18:
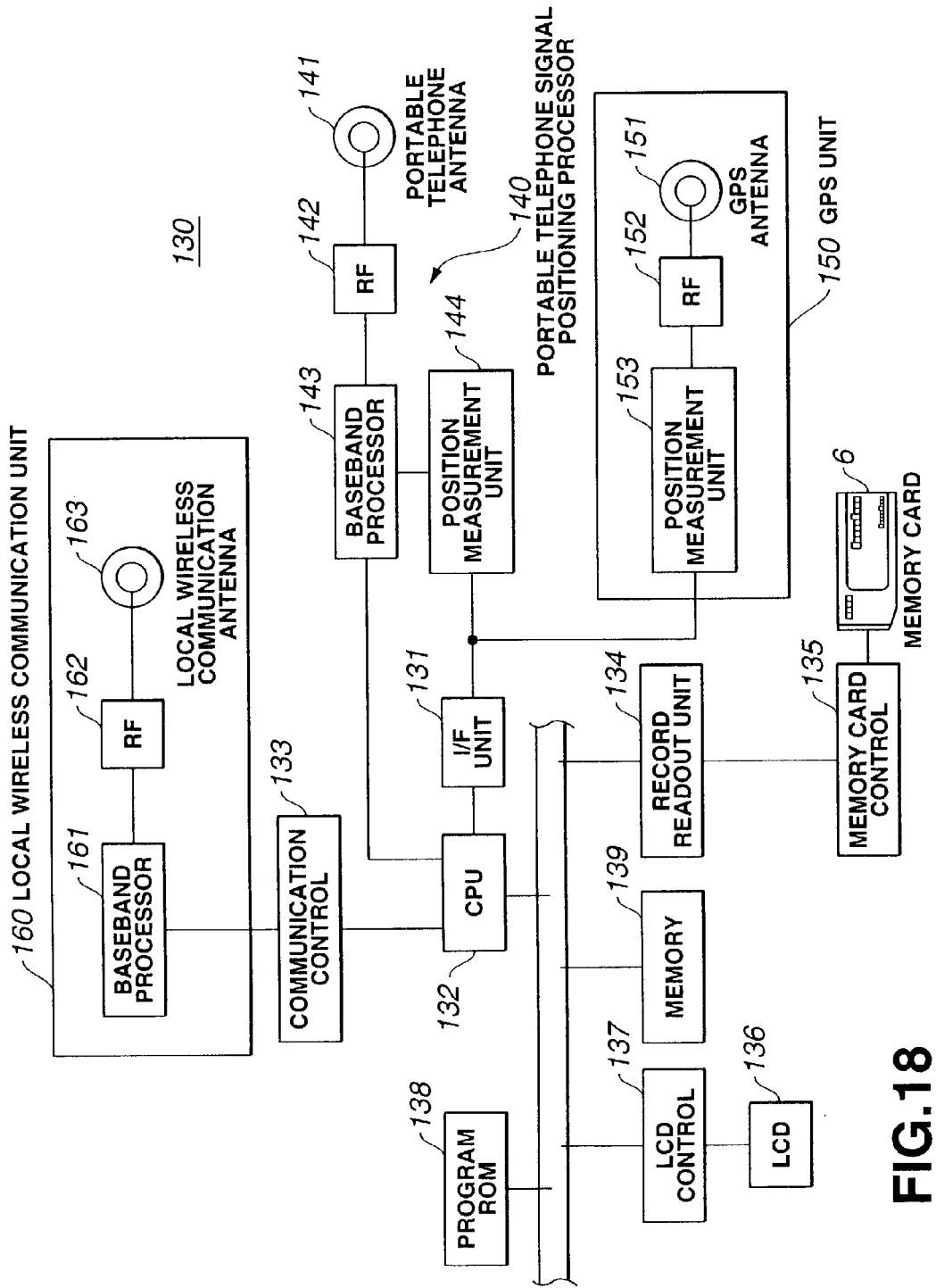
FIG. 18 is a block diagram showing an inner structure of a potable telephone set having enclosed the function as the positioning information device.

FIG. 18 shows a structure of the portable telephone set 130, having enclosed the function of the positioning information transmitting device.

This portable telephone set 130 includes a portable telephone signal positioning processor 140, for receiving signals for the portable telephone for measuring the current site, as a specified instance of the function of receiving base station signals from the portable telephone base station 2 for site measurement. Specifically, the electrical wave from the portable telephone base station 2 is received over the portable telephone antenna 141, to undergo signal extraction in an RF processor 142 followed by signal processing in a baseband processor 143. The phase difference of the processed signal is measured by a site measurement unit 144 to calculate the latitude and the longitude of the current site.

The portable telephone set 130 includes a GPS unit 150, as a specified instance of the function of receiving GPS signals from the GPS satellite 1, for receiving the GPS signals for measuring the current site. This GPS unit extracts signals at the RF signal processor 152 from the electrical wave received over the GPS antenna 151 to calculate the latitude, longitude and the altitude of the current site and the current time by a site measurement unit 153.

The current site data, as the positioning information of the current site, as calculated by the portable telephone signal positioning processor 140 and/or the GPS unit 150, is transferred through an interfacing (I/F) unit 131 to the CPU 132. The term 'portable telephone signal positioning processor 140 and/or the GPS unit 150' is used here for the same reason as discussed above.

The portable telephone set 130 includes the local wireless communication unit 160 capable of exchanging data with a peripheral device(s). The data transmitted by the portable telephone set 130 is transmitted from a CPU 132 through a local wireless communication unit 133 so as to be processed by a baseband processor 161 of the local wireless communication unit 160. The resulting processed signal is superposed on a carrier wave by an RF processor 162 so as to be transmitted over a wireless path to a peripheral device(s) over a local wireless communication antenna 163. Conversely, the electrical wave transmitted over a wireless path from the peripheral device(s) is received by the local wireless communication antenna 163 to undergo signal extraction in the RF processor 162 followed by signal processing in the baseband processor 161. The resulting signal is sent through the communication unit 133 to the CPU 132.

The portable telephone set 130 includes a record readout unit 134, capable of recording/reading out data on or from a memory card 6. The movement trajectory data, used for action log, is sent from the CPU 132 through the record readout unit 134 and a memory card controller 135 so as to be written in the memory card 6. Conversely, the CPU 132 is able to read out data from the memory card 6.

The portable telephone set 130 also includes an LCD 136 capable of displaying the positioning state, such that display data may be displayed from the CPU 132 as necessary on the LCD 136 through LCD controller 137. A specified instance of display data on this LCD 135 is as indicated in FIG. 3.

The portable telephone set 130 also includes an enclosed program ROM 138 in which there are stored an operating system (OS) and an application software executed next to this OS, such as a program for measuring the current site and subsequently transmitting site data to a requesting device or a program for recording the movement trajectory in the memory card. These programs are read out by the CPU 132 and executed with the memory 139 as a working area.

Reverting to FIG. 17, the operation of a specified instance of the positioning information transmitting/receiving system, made up by the portable telephone set 130 and the digital camera 80, is now explained.

The digital camera 80 requests the current site and time data to the portable telephone set 130 through the local wireless communication unit 81 as necessary (1). On receipt of the request, the portable telephone set 130 receives signals from the GPS satellite 1 and/or the portable telephone base station 2 to calculate the current site and the current time. The so calculated current site and time data are re-transmitted through the local wireless communication unit 160 to the peripheral device which has made the request. Moreover, if the movement trajectory recording mode is ON, the portable telephone set 130 records the current site time data in the memory card 6.

The processing carried out between the portable information terminal device 130 and the digital camera 80 (shown in FIG. 17) in the positioning information transmitting/receiving system 70, is now explained using a flowchart shown in FIG. 6. Here, the processing of the portable telephone set 130 sending (2) the latitude longitude time information responsive to the latitude longitude time request (1) from the digital camera 80 is explained. This processing is carried out as a result of an application program corresponding to the flowchart being read out from the program ROM 138 to the RAM 139 by the CPU 132 of FIG. 18 and being then executed with the RAM 139 as the work area.

First, the portable telephone set 130 at step S1 checks whether or not positioning is feasible. If the positioning is feasible (YES), the portable telephone set proceeds to step S2 to calculate the current site by the aforementioned GPS unit 150 and/or the portable telephone signal positioning processor 140.

If it is determined at step S3 that there has been made a request (1) for the latitude longitude time from a peripheral device (digital camera 80) (YES), the portable telephone set proceeds to step S4 to send the latitude longitude time information (2) through local wireless communication unit 160.

If it is determined at step S5 that the movement trajectory recording mode has been selected, the portable telephone set records the latitude longitude time information in the memory card 6 at step S6. The portable telephone set then reverts to step S1.

If it is determined at step S3 that there has not been made a request (1) for the latitude longitude time information from the peripheral device (digital camera 80) (NO), the portable telephone set proceeds to the aforementioned step S5.

If it is determined at step S5 that the movement trajectory recording mode has not been selected, the portable telephone set skips step S6 to revert to step S1.

In this manner, the portable telephone set 130 sends (2) the latitude longitude time information, responsive to the latitude longitude time information (1) from the digital camera 80. The digital camera 80 is able to add the so transmitted latitude longitude time information to the photographed image. The portable telephone device 130 is also able to leave the movement trajectory in the memory card 6 as action log.

Figure 19:
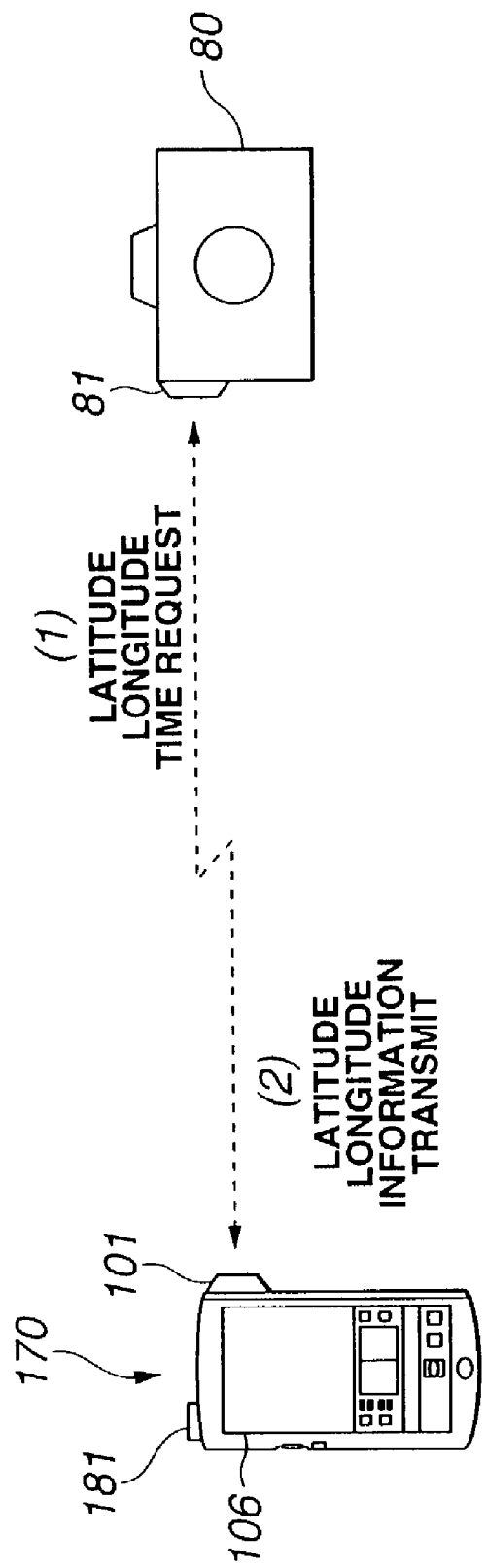
FIG. 19 illustrates schematics of communication in the positioning information transmitting/receiving system comprised of a potable information terminal device having enclosed the function as the positioning information device and a digital camera.

FIG. 19 shows an instance of the positioning information transmitting/receiving system comprised of a portable telephone set 170 having enclosed the functions of the positioning information transmitting device, and a digital camera 80. This portable telephone set 170 includes a GPS antenna 181 and a local wireless communication unit 101 for activating the functions of the enclosed positioning information transmitting device.

Figure 20:
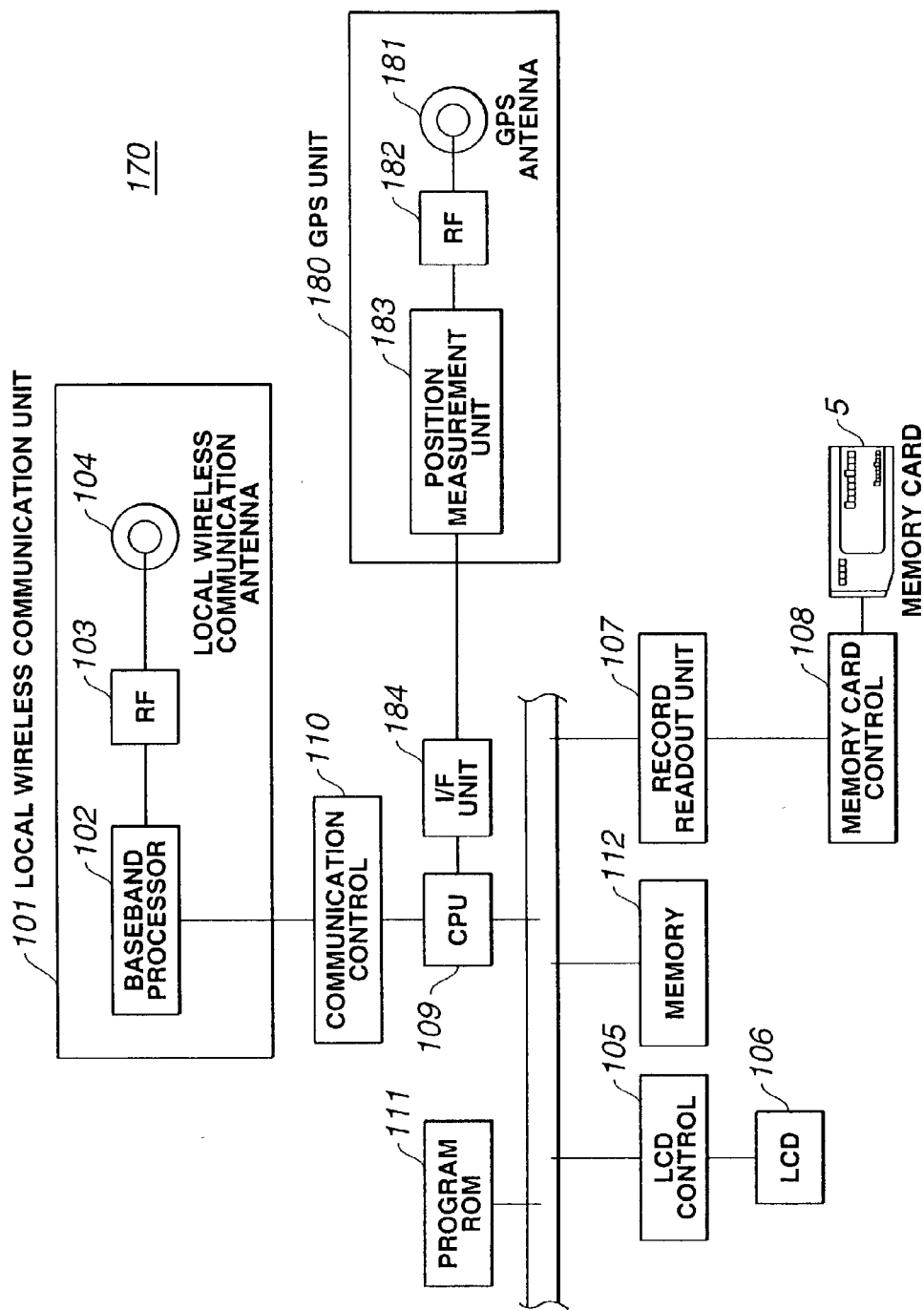
FIG. 20 is a block diagram showing an inner structure of a portable information terminal device having enclosed the function as the positioning information device.

FIG. 20 shows the structure of the portable information terminal device 170 having enclosed the functions of the positioning information transmitting device.

The portable information terminal device 170 includes a GPS unit 180, as a specified example of the function of receiving GPS signals from the GPS satellite 1, for receiving the GPS signals for measuring the current site. This GPS unit extracts signals from the electrical wave received over a GPS antenna 181, by an RF processor 182, to calculate the latitude and the longitude of the current site and the current time by a site measurement unit 183.

The current site data, as the positioning information for the current site, calculated by the GPS unit 180, is transferred through an interfacing (I/F) unit 184 to the GPU 109.

The structure of the portable information terminal device is substantially the same as that of the portable information terminal device 100, shown in FIG. 14, as to other components, inclusive of the CPU 109. However, the record readout unit 107 is controlled by the CPU 109 and writes data of the movement trajectory in the memory card 5 through a memory card controller 108. Conversely, data can also be read out from the memory card 5.

Reverting to FIG. 19, the operation of the specified instance of the positioning information transmitting/receiving system, comprised of the portable information terminal device 170 and the digital camera 80, is explained.

The digital camera 80 requests current site time data from the portable information terminal device 170 through the local wireless communication unit 81 as necessary (1). On receipt of the request, the portable information terminal device 170 receives signals from the GPS satellite 1 over GPS antenna 181 to calculate the current site and the current time. The so calculated current site time data is re-transmitted through the local wireless communication unit 101 to the requesting peripheral device (2). In addition, if the movement trajectory recording mode is ON, the portable information terminal device 170 records the current site time data in the memory card 5.

The processing carried out between the portable information terminal device 170 and the digital camera 80 (shown in FIG. 19) in the positioning information transmitting/receiving system, is now explained using a flowchart shown in FIG. 6. Here, the processing of the portable information terminal device 170 sending (2) the latitude longitude time information responsive to the latitude longitude time request (1) from the digital camera 80 is explained. This processing is carried out as a result of an application program corresponding to the flowchart being read out from the program ROM 111 to the RAM 112 by the CPU 109 of FIG. 20 and being then executed with the RAM 112 as work area.

First, the portable information terminal device 170 at step S1 checks whether or not positioning is feasible. If the positioning is feasible (YES), the portable information terminal device proceeds to step S2 to calculate the current site by the aforementioned GPS unit 180.

If it is determined at step S3 that there has been made a request (1) for the latitude longitude time from a peripheral device (digital camera 80) (YES), the portable information terminal device 170 proceeds to step S4 to send the latitude longitude time information (2) through local wireless communication unit 101.

If it is determined at step S5 that the movement trajectory recording mode has been selected, the portable information terminal device at step S6 records the latitude longitude time information in the memory card 6. The portable information terminal device then reverts to step S1.

If it is determined at step S3 that there no request (1) for the latitude longitude time information has been made from the peripheral device (digital camera 80) (NO), the portable information terminal device proceeds to the aforementioned step S5.

If it is determined at step S5 that the movement trajectory recording mode has not been selected, the portable information terminal device skips step S6 to revert to step S1.

In this manner, the portable information terminal device 170 sends (2) the latitude longitude time information responsive to the latitude longitude time information request (1) from the digital camera 80. The digital camera 80 is able to add the so transmitted latitude longitude time information to the photographed image. The portable information terminal device 170 is also able to leave the movement trajectory in the memory card 5 as action log.

Figure 21:
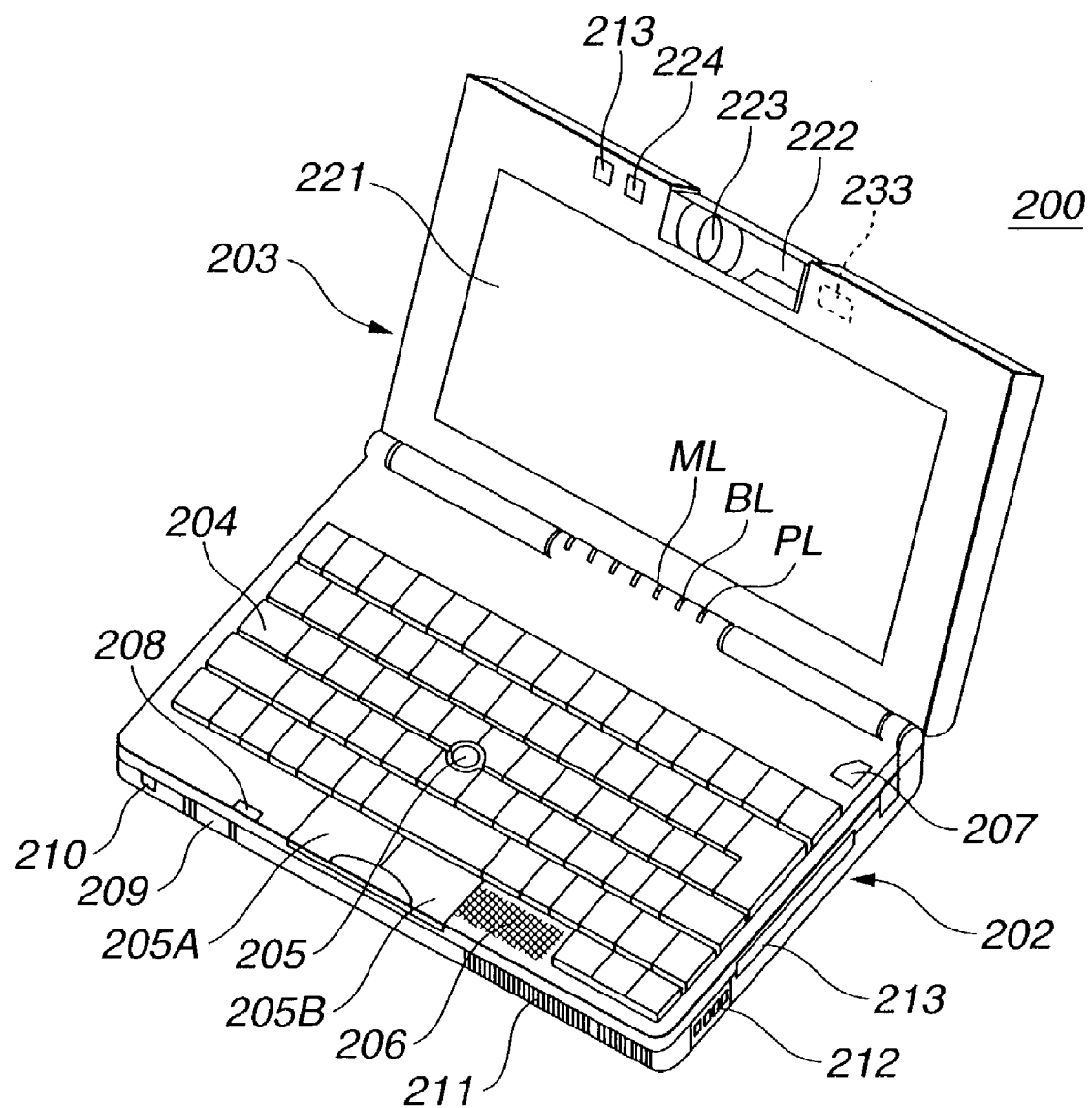
FIG. 21 shows the appearance of a portable personal computer device having enclosed the function as the positioning information device.

The positioning information transmitting device of the present invention may also be enclosed in a portable personal computer device 200, the appearance of which is shown in FIG. 21. This portable personal computer device 200 is an easy-to-carry portable personal computer device, with a size of not larger than B5 size, as an example. The portable personal computer device 200 includes a GPS antenna 258 and a local wireless communication unit 230, as later explained, for activating the functions of the enclosed positioning information transmitting device.

This portable personal computer device 200 is made up by a main body unit 202 and a display unit 203, openably mounted to the main body unit 202, and to which is mounted a local wireless communication antenna 233 of the local wireless communication unit 230, which will be explained subsequently.

The main body unit 202 is provided with plural operating keys 204 on its upper surface for entering various letters or characters, symbols and numerical figures, a stick type pointing device 205, acted on in displacing a cursor, indicated and input on the display unit 203, an enclosed loudspeaker 206, and a shutter button 207 acted on in photographing an image by a CCD (charge coupled device) camera 223 provided on the display unit 203.

On the front side of the display unit 203, there is mounted a liquid crystal display 221, comprised of an LCD (liquid crystal display). At an upper mod portion on the front surface thereof, an imaging unit 222, provided with a CCD camera 223, is mounted for rotation with respect to the display unit 203.

The imaging unit 222 is adapted for being rotated within an angular extent of 180° between the front side and the back side of the display unit 203 for being positioned at an optional position. The imaging unit 222 is provided with an adjustment ring for focussing adjustment of the CCD camera 223.

On the front surface of the display unit 203, there is provided a microphone 224 on the immediately left side of the imaging unit 222, so that the sound may be collected through the microphone 224 from the back side of the display unit 203.

On the lower mid portion of the front side in the display unit 203, there are provided a power source lamp PL, comprised of an LED (light emitting diode), a battery lamp BL, a message lamp ML and other lamps adapted for various other usages.

At the front upper end of the display unit 203, there is provided a pawl 213 on the immediately left side of the microphone 224, while an opening 208 is formed at a preset position of the main body unit 202 in register with the pawl 213. The pawl 213 is fitted in the opening 208 to effect lock, as the display unit 203 remains closed with respect to the main body unit 202.

On the back surface of the display unit 203, there is provided a local wireless communication antenna 233, which will be explained subsequently.

On the front side of the main body unit 202 is mounted a slide lever 209, as shown in FIG. 21. This slide lever 209 is slid along the front surface, in an arrow mark direction, to unlock the pawl 213 fitted in the opening 208 to open the display unit 203 with respect to the main body unit 202.

On the front surface of the main body unit 202, there is mounted a programmable power key (PPK key) 210 which may be pressed only once to boot a preset application software (referred to below simply as application) to automatically execute a sequence of preset operations. On the right end of the main body unit 20 are mounted plural suction openings 211.

Figure 22:
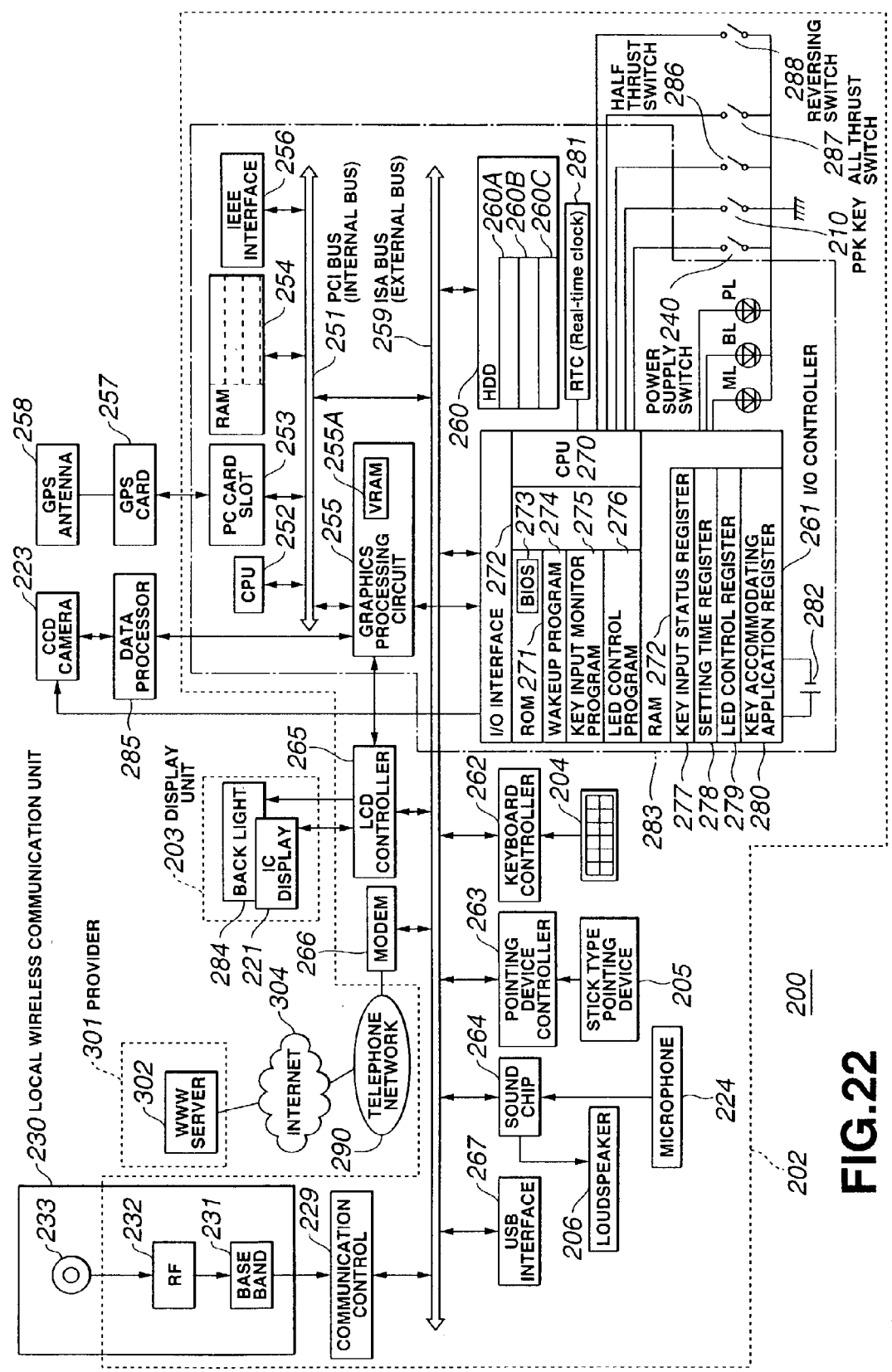
FIG. 22 shows an inner structure of a portable personal computer device having enclosed the function as the positioning information device.

The internal circuitry of the portable personal computer device 200 is now explained. Referring to FIG. 22, there are connected, to a PCI (Peripheral Component Interconnect) bus 251 of a booting sequence controller 283 of the main body unit 202, a CPU (central processing unit) 252, a PC (personal computer) card slot 253, a RAM (random access memory) 254, a graphics processing circuit 255 for generating an image displayed on a liquid crystal display 221 of the display unit 203, and an IEEE interface 256, directly coupled to an IEEE1396 terminal 241, which is adapted for being connected to another computer device or to an external equipment for taking in digital data.

The CPU 252 is a controller for comprehensively controlling various functions of the main body unit 202 and is adapted for executing various programs loaded on the RAM 254 to execute various functions.

To the PCI bus 251 is connected an ISA (Industrial Standard Architecture) bus 259, to which are connected a hard disc drive 260, an I/O (In/Out) controller 261, a keyboard controller 262, a pointing device controller 263, a sound chip 264, an LCD controller 265, a modem 266 and a USB interface 267.

The keyboard controller 262 controls the inputting of a control signal caused by pressing the operating keys 204 (FIG. 21), while the pointing device controller 263 controls the inputting of a control signal from the stick type pointing device 205 (FIG. 21).

The sound chip 264 takes in the speech input from the microphone 224 (FIG. 21) or sends speech signals to the enclosed loudspeaker 206 (FIG. 11), while the modem 266 connects to a WWW server 302 of a provider 301 over a public telephone network 290 and the Internet 304. Meanwhile, the USB interface 267 is connected to a USB terminal 242 for connection to peripheral equipment, such as USB mouse or flexible disc drive.

In the hard disc drive 260, there are stored an OS (operating system) 260A, made up by Window98 (trademark), an HTML browser 260B, an application program 60C for performing processing in accordance with a flowchart shown in FIG. 6, and a variety of application software, not shown. These software programs are read out as necessary for loading on the RAM 254.

The I/O controller 261 is comprised of interconnection of an I/O interface 269, a CPU 270, a ROM (read-only memory) 271, comprised of EPROM (Electrically Erasable and Programmable Read Only Memory) and a RAM 272, and is supplied with the current time by an RTC (real-time clock) 281.

In the ROM 271 of the I/O controller 261, there are stored a BIOS (Basic Input/Output System) 273, a wake-up program 274, a key input monitor program 275 and an LED control program 276, whereas, in the RAM 272, there are provided a key input status register 277, a setting time register 278, an LED control register 279, and a key accommodating application register 280.

In the key input status register 277, stored in the RAM 272, an operating key flag is stored. The CPU 270 monitors whether or not the PPK key 210 for one-touch operation has been pressed, based on the key input monitor program 275. When the PPK key 210 is pressed, the operating key flag is stored in the key input status register 277.

In the setting time register 278 may be stored the time information, such as start time, optionally set in advance by the user. The CPU 270 detects whether or not the current time afforded by the RTC 281 is the optionally set start time, based on the wake-up program 274, and executes the preset processing at the start time.

The key accommodating application register 280 memorizes the relationship of correspondence between the PPK key 210 and the operating keys 204 of different combinations on one hand and the applications to be booted on the other hand, in association with the PPK key 210 and preset combinations of the operating keys 204. When the PPK key 210 and preset combinations of the operating keys 204 are pressed, the CPU 270 sends control data for booting the associated applications to the CPU 252, over the ISA bus 259 and the PCI bus 251, in order to boot the application software, consistent with the control data, by the CPU 252.

When the application software stored in the key accommodating application register 280 is booted to terminate the operation, the LED control register 279 holds an end flag. On detection that the end flag has been stored in the LED control register 279, based on the LED control register 279, the CPU 270 causes a message lamp ML to be turned on.

When the power source switch 240 is pressed, the LED control register 279 stores the power source flag, whereas, when the main body unit 202 is in operation under the power supply voltage from the battery, the LED control register 279 stores a battery flag. Thus, on detecting that the power source flag or the battery flag has been stored, based on the LED control program 276, the CPU 270 turns on a power supply lamp PL and a battery lamp BL.

Since a backup battery 282 is connected to the I/O controller 261, the data of the key input status register 277, setting time register 278, LED control register 279 and the key accommodating application register 280 of the RAM 272, are held, even if the power supply switch 240 of the main body unit 202 is turned off, such that there is no power supply from a power source.

An inverting switch 288, connected to the I/O controller 261, is turned on when the imaging unit 222 has been rotated through 180° in a direction of imaging the opposite side of the liquid crystal display 221 of the display unit 203, and notifies the state to the CPU 270. The PPK key 210 also notifies that effect to the CPU 270, as when the inverting switch 288 has been pressed.

When the shutter button 207, provided on the upper surface of the main body unit 202, is pressed partway, a half-thrust switch 286 is turned on to advise the state to the CPI 270 of the I/O controller 261. When the shutter button 207 is pressed to its full stroke, a full-thrust switch 287 is turned on to advise the state to the CPI 270 of the I/O controller 261.

That is, if a capture software, among the various applications of the hard disc drive 260, is booted, and the shutter button 207 is pressed partway by the user, the CPU 270 of the I/O controller 261 enters into the still image mode. If the CCD camera 223 is controlled to execute the freeze of the still image, and the shutter button is pressed to its full stroke, the CPU captures the frozen still image data to send the so captured data to a data processor 285.

If conversely the CPU 270 of the I/O controller 261 enters into the moving image mode as the capture software is not booted, the CPU of the I/O controller captures the moving images of up to approximately 60 seconds at the maximum to send the so captured moving images to the data processor 285.

The I/O controller 261 is also adapted for controlling the graphics processing circuit 255, connected to the PCI bus 251, such that picture data, comprised of the still image or moving images, captured by the CCD camera 223, is processed in a preset fashion by the data processor 285 and subsequently input to the graphics processing circuit 255.

The graphics processing circuit 255 holds picture data supplied thereto in an enclosed VRAM (Video Random Access memory) 255A, from which the data may be read out and sent to the LCD controller 265 for storage in the hard disc drive 260 as necessary.

The LCD controller 265 controls a back light 284 of the display unit 203 to illuminate the back side of the liquid crystal display 221, while causing the picture data from the graphics processing circuit 255 to be output to the liquid crystal display 221 for display thereon.

A communication controller 229 is connected over PCI bus 251 and ISA bus 259 to the CPU 252. To the communication controller 229 is connected a local wireless communication unit 230, which local wireless communication unit 230 includes a wireless communication antenna 233 provided on the back surface of the display unit 203.

The data transmitted by this portable personal computer device 200 is sent from the CPU 252 through the communication controller 229 and processed by the baseband processor 231 of the local wireless communication unit 230. The so processed data is superposed on a carrier wave in the RF processor 232 so as to be transmitted over local wireless communication unit 230 to a peripheral device(s). Conversely, the electrical wave sent over wireless path from the peripheral device(s) is received by the local wireless communication antenna 233 and processed with signal extraction by the RF unit 232 and with signal processing by the baseband signal processor 231 so as to be sent through the communication controller 229 to the CPU 252.

The PC card slot 213, connected to the PCI bus 251, is properly loaded via a PC card, not shown, when adding optional functions, so that data may be exchanged through this PC card with the CPU 252. For example, when a GPS (Global Positioning System) card 257 of the PCMCIA type is loaded in the PC card slot 213, the electrical wave from the GPS satellite is received by the GPS antenna 258 connected to the GPS card 257 to obtain current site data.

Thus, the GPS card 257 sends the current site data, received over GPS antenna 258, such as latitude data, longitude data and altitude data, over the PCI bus 251 to the CPU 252. That is, the portable personal computer device 200 includes a GPS unit in turn including a GPS antenna 258.

The processing performed between this portable personal computer device 200 and e.g., the digital camera 80, is now explained mutatis mutandis with reference to the flowchart of FIG. 6. Here, the processing of the portable personal computer device 200 sending the latitude longitude time information responsive to the latitude longitude time request from the digital camera 80 is explained. This processing is carried out as a result of an application program corresponding to the flowchart being read out from the HDD 260 of FIG. 22 to the RAM 254 by the CPU 252 and being then executed with the RAM 112 as work area.

First, the portable personal computer device 200 at step S1 checks whether or not positioning is feasible. If the positioning is feasible (YES), the portable information terminal device 200 proceeds to step S2 to calculate the current site by the aforementioned GPS unit.

If it is determined at step S3 that there has been made a request for the latitude longitude time from a peripheral device (digital camera 80) (YES), the portable information terminal device 200 proceeds to step S4 to send the latitude longitude time information through local wireless communication unit 230.

If it is determined at step S5 that the movement trajectory recording mode has been selected, the portable information terminal device records the latitude longitude time information in the memory card (step S6). The portable information terminal device then reverts to step S1.

If it is determined at step S3 that there no request for the latitude longitude time information has been made from the peripheral device (digital camera 80) (NO), the portable information terminal device 200 proceeds to the aforementioned step S5.

If it is determined at step S5 that the movement trajectory recording mode has not been selected, the portable information terminal device skips step S6 to revert to step S1.

In this manner, the portable information terminal device 200 sends the latitude longitude time information responsive to the latitude longitude time information from the digital camera 80. The digital camera 80 is able to add the so transmitted latitude longitude time information to the photographed image. The portable information terminal device 200 is also able to leave the movement trajectory in the memory card 5 as action log.

Although the foregoing respective instances are those in which the GPS positioning and the positioning by an electrical wave from the portable telephone base station are used in the method of measuring the current site, the present invention is not limited thereto and may also be applied to a positioning system with short and long waves by e.g., television or wireless or the positioning system by a gyro, a compass or map matching.

Although the wireless communication termed Bluetooth employing the 2.4 GHz band is used in the above-described respective embodiments in the wireless communication system between the positioning information transmitting device and the peripheral device(s), the present invention is not limited thereto and may also use a wireless communication system as used in IEEE802.11 communication in the 5 GHz band, portable telephone or cordless telephone, a wireless communication system of the frequency modulation (FM) system or an infrared communication system.

In the above-described respective embodiments, the memory card is a MemoryStick (registered trademark). However, the present invention is not limited thereto and may also use a magnetic recording system, such a semiconductor memory card, for example a PC card, hard disc or flexible disc, or an optical disc system, such as CD-R or Mini-Disc.

The above-described respective embodiments refer to an illustrative application of a digital camera which has received the current site time data from the portable information terminal device. However, the present invention is not limited thereto and may also be directed to an imaging application for a portable personal computer device, carrying a CCD camera, a portable telephone device, a portable information terminal device, a video camera or a halide camera.

The above-described respective embodiments refer to an illustrative application of a portable information terminal device which has received current site data from the positioning information transmitting device. The present invention however is not limited thereto and may also be directed to a map viewer software for a portable personal computer or a portable telephone set or to a map display application such as a car navigation system.

In the above-described respective embodiments, it is stated that XML is used in data communication between the positioning information transmitting device and the peripheral device(s). The present invention, however, is not limited thereto and may be applied to a binary data system, an ASCII letter system, an HTML (HyperText Markup Language) system, a WAP (Wireless Application Protocol) system, PostScript (descriptive language developed by Adobe Inc., USA) or to a JAVA script (language for program development, developed by Sun Microsystem Inc. USA). In addition, HTTP (HyperText Transfer Protocol) may also be used.

The positioning information transmitting device 10 is stated to be a portable device driven by the power from the enclosed battery 58. However, the positioning information transmitting device may also be of a stationary type driven by the power from the commercial power supply. In such case, there is no movement trajectory data left as action log.

What is claimed is:

1. A positioning information processing system comprising:
    a first device including:
        a first wireless transceiver configured to communicate with a base station of a cellular telecommunication network, said first wireless transceiver operating to receive cellular telephone service and positioning service from said base station;
        a second wireless receiver configured to receive positioning service from the GPS system;
        a first positioning processor configured to process the positioning services from said base station and the GPS system to obtain current positioning information of said first device; and
        a third wireless transmitter configured to transmit over a local area wireless network the obtained current positioning information of said first device;
    a second device including:
        a graphical processor configured to receive or capture media data;
        a fourth wireless receiver for receiving the transmitted current positioning information of said first device; and
        a second positioning processor for processing and converting the received positioning information into place name, time and/or location coordinates that can be attached or associated with said media data to better identify said media data.

2. The positioning information processing system according to claim 1, wherein said second device is in close proximity to said first device such that the current positioning information of said first device provides good approximation of a current position of said second device including said media data.

3. The positioning information processing system according to claim 1, wherein said graphical processor includes a portable image pickup device configured to image an object and record and/or output an image of said object.

4. The positioning information processing system according to claim 1, wherein said second device is a portable information terminal device having a display unit for displaying map information, said terminal device configured to associate said place name or location coordinates to a point on a map.

5. The positioning information processing system according to claim 1, wherein said first device includes a cellular telephone.

6. The positioning information processing system according to claim 1, wherein said second device includes a digital camera.

7. The positioning information processing system according to claim 6, wherein said media data includes a digital photograph image.

8. The positioning information processing system according to claim 1, wherein said second device includes a personal digital assistant (PDA).

9. The positioning information processing system according to claim 8, wherein said media data includes a graphical map display.

10. A positioning information processing method comprising:
    providing a first device including:
        configuring a first wireless transceiver to communicate with a base station of a cellular telecommunication network, said first wireless transceiver operating to receive cellular telephone service and positioning service from said base station;

configuring a second wireless receiver to receive positioning service the GPS system;

configuring a first positioning processor to process the positioning services from said base station and the GPS system to obtain current positioning information of said first device; and configuring a third wireless transmitter to transmit over a local area wireless network the obtained current positioning information of said first device;

providing a second device including:

configuring a graphical processor to receive or capture media data;

configuring a fourth wireless receiver to receive the transmitted current positioning information of said first device; and configuring a second positioning processor to process and convert the received positioning information into place name, time and/or location coordinates that can be attached or associated with said media data to better identify said media data.

11. The positioning information processing method according to claim 10, wherein said second device includes a digital camera.

12. The positioning information processing method according to claim 10, wherein said media data includes a digital photograph image.

13. The positioning information processing method according to claim 12, wherein said attaching or associating said processed and converted positioning information with said media data includes attaching said place name, time and/or location coordinates to the digital photograph image.

14. A recording medium having recorded thereon a computer program, for processing positioning information, the program comprising executable instructions that cause a computer to:

provide a first device including:

configuring a first wireless transceiver to communicate with a base station of a cellular telecommunication network, said first wireless transceiver operating to receive cellular telephone service and positioning service from said base station;

configuring a second wireless receiver to receive positioning service from the GPS system;

configuring a first positioning processor to process the positioning services from said base station and the GPS system to obtain current positioning information of said first device; and configuring a third wireless transmitter to transmit over a local area wireless network the obtained current positioning information of said first device;

provide a second device including:

configuring a graphical processor to receive or capture media data;

configuring a fourth wireless receiver to receive the transmitted current positioning information of said first device; and configuring a second positioning processor to process and convert the received positioning information into place name, time and/or location coordinates that can be attached or associated with said media data to better identify said media data.

* * * * *